(12) United States Patent
Monaghan et al.

(10) Patent No.: US 11,096,261 B1
(45) Date of Patent: Aug. 17, 2021

(54) SYSTEMS AND METHODS FOR ACCURATE AND EFFICIENT SCENE ILLUMINATION FROM DIFFERENT PERSPECTIVES

(71) Applicant: Illuscio, Inc., Culver City, CA (US)

(72) Inventors: Robert Monaghan, Ventura, CA (US); Joseph Bogacz, Perth (CA)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/185,615

(22) Filed: Feb. 25, 2021

(51) Int. Cl.
 *H05B 47/11* (2020.01)
 *H04N 5/235* (2006.01)
 *H04N 13/275* (2018.01)

(52) U.S. Cl.
 CPC ........... *H05B 47/11* (2020.01); *H04N 5/2351* (2013.01); *H04N 13/275* (2018.05)

(58) Field of Classification Search
 CPC ..... H05B 47/11; H05B 47/125; H04N 5/2351
 See application file for complete search history.

(56) References Cited

U.S. PATENT DOCUMENTS

| | | | |
|---|---|---|---|
| 9,740,083 B1* | 8/2017 | Hennings | G06K 9/00241 |
| 2014/0063288 A1* | 3/2014 | Suh | G01J 1/0414 |
| | | | 348/229.1 |
| 2016/0034777 A1* | 2/2016 | Kelley | G06T 7/11 |
| | | | 348/46 |
| 2017/0265275 A1* | 9/2017 | Shih | H05B 47/125 |
| 2019/0011312 A1* | 1/2019 | Lee | H04N 5/243 |
| 2021/0056348 A1* | 2/2021 | Berlin | G06T 11/001 |

* cited by examiner

*Primary Examiner* — Jayanti K Patel
*Assistant Examiner* — Christopher Kingsbury Glover
(74) *Attorney, Agent, or Firm* — Ansari Katiraei LLP; Arman Katiraei; Sadiq Ansari

(57) ABSTRACT

A sensor sphere may measure light and/or other properties of an environment from a multitude of angles and/or perspectives. A rendering system may obtain measurements that the sensor sphere generates as a result of measuring light in the environment from a common position and the multitude of angles and/or perspectives. The rendering system may receive image(s) that capture the environment from a first perspective, may determine a first set of the measurements that measure the lighting from the first perspective, may determine a second set of the measurements that measure the lighting from a different second perspective, may illuminate the environment from the second perspective by adjusting the lighting of the environment according to a difference between the second set of measurements and the first set of measurements, and may render the environment from the second perspective with the adjusted lighting.

18 Claims, 16 Drawing Sheets

SYSTEMS AND METHODS FOR ACCURATE AND EFFICIENT SCENE ILLUMINATION FROM DIFFERENT PERSPECTIVES

BACKGROUND

Lighting, shading, coloring, reflections, and/or other visual characteristics may change as one's viewing perspective changes. For instance, the lighting and coloring of an object may appear different when viewing the object from behind a light source versus viewing the same object perpendicularly to the light source. In this case, the reflections may change, the brightness of different color components may change, and/or other visual characteristics of the object may change from the different viewing perspectives.

Different visual effects balls may be placed in a scene, and the surface of these visual effects balls may be imaged to account for how light, reflections, and/or other visual characteristics may change from the different viewing perspectives. In particular, a first chrome, reflective, and/or mirror ball may be used to capture the light and reflections from different viewing perspectives, and a second matte or gray ball may be used to capture the shading from the different viewing perspectives. Other visual effects balls may also be used to capture other visual characteristics of the scene.

In a video in which a digitally created object is to be inserted and moved within the scene, the visual effects balls may be moved in the same path as the object, and the surface of the balls may be recorded. The information captured from recording the surface of the balls may provide a reference for the lighting, shading, reflections, and/or other visual characteristics that should be applied when digitally inserting the object into the scene to make it seems as if the object was physically present in the scene when filming the scene.

However, the mapping of information from the surface of the visual effects balls to the scene may be computationally expensive and time-consuming. Moreover, the mapped information may be inaccurate because of the lossy nature of using a camera to image the surface of the balls from a distance, and then attempting to map the information from that small surface across the scene. The curved shape of the visual effects balls may also distort the reference data that is obtained from the surface of the balls. In other words, the size and shape of the visual effects balls, the resolution of the camera used to image the surface of the balls, and the distance of the camera from the balls are all factors that can lead to a loss of information.

Ray-tracing is a lighting technique that may be used to artificially light a 3D scene without requiring the information from the visual effects balls. Ray-tracing may involve tracing how different rays or beams of light originating from a light source bounce off different objects in the scene prior to being captured by a camera from which the scene is rendered or imaged. Ray-tracing may be extremely computationally expensive, and may still provide inaccurate lighting, shading, coloring, and/or other visual characteristics due to the light being artificially positioned and/or created.

DETAILED DESCRIPTION OF PREFERRED EMBODIMENTS

Figure 1:
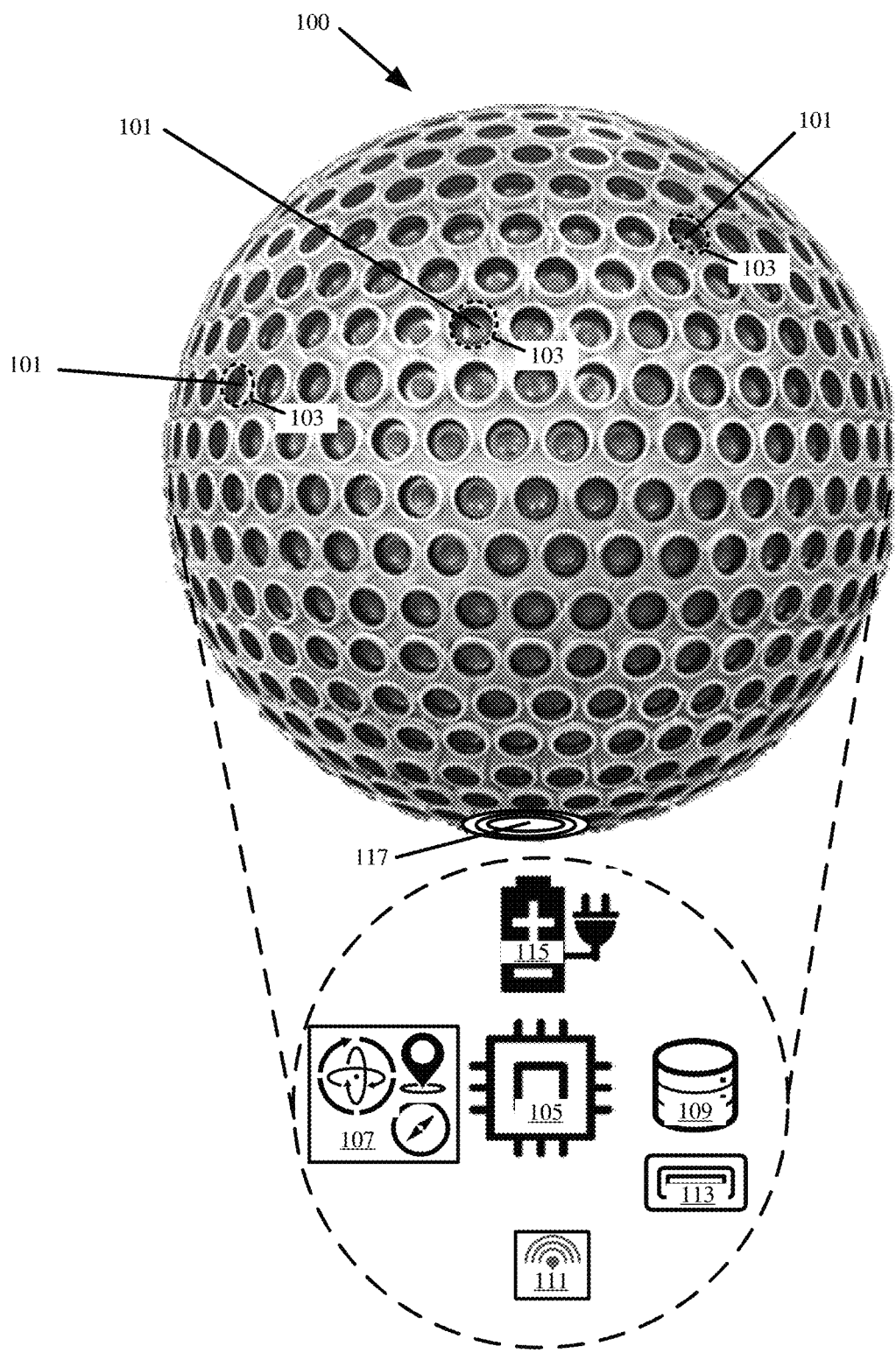
FIG. 1 illustrates an example of a sensor sphere in accordance with some embodiments presented herein.

The following detailed description refers to the accompanying drawings. The same reference numbers in different drawings may identify the same or similar elements.

Provided are systems and methods for accurately and efficiently lighting, shading, coloring, and/or otherwise adjusting visual characteristics of point cloud data points or three-dimensional ("3D") objects and environments from different render positions. The systems and methods may include a sensor sphere that replaces visual effects balls and that directly measures light, reflections (e.g., specular or spectral highlights), and/or other properties of a scene from a multitude of angles and/or perspectives. The systems and methods may further include a rendering system that accurately and efficiently adjusts lighting, shading, coloring, reflections, and/or other visual or non-visual characteristics of point cloud data points, objects in a 3D scene, and/or an entire 3D scene for different viewing perspectives based on a direct mapping to the light and/or other properties measured by the sensor sphere for the same viewing perspectives. The systems and methods may further include a light calibration device that uses the light and/or properties measured by the sensor sphere to physically identify the placement of one or more lights illuminating a scene or reflections within the scene, and/or to calibrate the one or more lights and/or placement of reflective materials to conform to previous measurements obtained by the sensor and/or desired lighting for the scene.

The sensor sphere may include a spherical device with a plurality of sensors disposed about the spherical surface of the device. Each sensor may capture light directionality, light intensity, reflectivity, shading, color, and/or other visual characteristics from a different angle or view perspective. In some embodiments, the sensor sphere may include a hood over each sensor to allow light from a particular angle or view perspective to reach that sensor and to filter out light from other angles or view perspectives that may otherwise distort or decrease the accuracy of the measurements taken by that sensor. In other words, the hood may focus light from a particular angle or view perspective onto a sensor so that the sensor may directly and accurately capture and/or measure the light and/or other properties for that particular angle or view.

The rendering system may use the collective data from the sensor sphere to accurately and efficiently render different point cloud data points, objects in a 3D scene, and/or an entire 3D scene from different perspectives by directly adjusting the lighting, shading, color, reflectivity (e.g., specular or spectral highlights), and/or other visual or non-visual characteristics of the data points, objects, and/or scene using the data that the sensor sphere measures for each rendered perspective. For instance, lighting information captured by one or more sensors of the sensor sphere that are angled to capture a particular view perspective may be directly applied and used to adjust visual characteristics of the data points, objects, and/or scene when rendered from that particular view perspective. The rendering system in conjunction with the light sphere may also be used for various industrial, commercial, manufacturing, and/or other applications. For instance, the light sphere and rendering system may be used for quality control to ensure that manufactured goods have similar visual characteristics as a reference good.

The rendering system may avoid the computationally expensive and inaccurate operations associated with unstitching and/or mapping the data that one or more cameras capture on the surface of one or more visual effects balls. Instead, the rendering system may directly identify which one or more sensors measured the light and/or other properties of the scene at the same angle or perspective at which the scene is to be rendered, and may use those measurements to directly adjust the scene lighting, reflectivity, and/or other visual characteristics.

Accordingly, the rendering system of some embodiments provides more efficient and/or more accurate lighting than systems reliant on the visual effects balls of the prior art. Moreover, the rendering system of some embodiments may produce lighting effects (e.g., lighting, shading, coloring, and/or adjustments of other visual characteristics) that are more accurate than ray-tracing techniques that rely on artificially created lights and a mathematical modeling of light, because the lighting effects produced by the rendering system are based on actual and/or real light sources that exist within the imaged scene and are measured for the same angle or perspective at which the scene is to be rendered.

The light calibration device may be integrated as part of the sensor sphere or may be a separate device. The light calibration device may include a plurality of visual indicators that are positioned and/or orientated in a same arrangement as the plurality of sensors of the sensor sphere. Each of the plurality of visual indicators may correspond to a different laser disposed above the surface of the light calibration device. In some embodiments, the light calibration device may include a single laser or visual indicator that may be directed to any of a plurality of directions and/or angles. The light calibration device may be positioned at or near the position of the sensor sphere in a scene, may receive the collective data from the sensor sphere, and may activate one or more of the plurality of visual indicators based on the collective data to identify exact locations of light sources or reflections in the scene as detected by the sensor sphere. In some embodiments, the sensor sphere and/or light calibration device may be a connected to a light control system, and may adjust different properties of the one or more lights via the light control system to match the properties that were previously measured by the sensor sphere. In this manner, the sensor sphere and/or light calibration sphere may ensure that the lighting that is used for a scene exactly matches lighting used during a previous take or previous capture of the scene at a different time.

FIG. 1 illustrates an example of sensor sphere 100 in accordance with some embodiments presented herein. Sensor sphere 100 may be a device with a spherical or round form. In some embodiments, sensor sphere 100 may range in diameter from 30 centimeters to 100 centimeters.

Plurality of sensors 101 may be distributed about the exterior surface of sensor sphere 100. In some embodiments, sensor sphere 100 may include as many as several hundred sensors 101 or as few as 4 sensors. The number of sensors 101 may be based on the size of sensor sphere 100 and/or a number of different angles or perspectives at which to measure light and/or other properties of a scene.

Each sensor 101 may be positioned about the surface of sensor sphere 100 with a different angle, direction, and/or orientation. Each sensor 101 may include a separate Charge-Coupled Device ("CCD"), Complementary Metal-Oxide-Semiconductor ("CMOS"), photodiode, and/or other device or detector with one or more photosites for capturing light and/or other visual or non-visual characteristics at the angle, direction, and/or orientation of that sensor 101. For instance, each sensor 101 may obtain one or more measurements of luminance, color, reflectivity, contrast, hue, saturation, and/or other attributes of light and/or color reaching that sensor 101 at the angle, direction, and/or orientation of that sensor 101.

In some embodiments, each sensor 101 may be inset within and/or covered by tube 103. Tube 103 may include a cylindrical, rectangular, or other hollowed hood or covering that is positioned over each sensor 101. Each tube 103 may extend one or more centimeters above and/or around a sensor 101. Tube 103 may extend in the same angle and/or direction of a covered sensor 101. Accordingly, tube 103 may focus light from a particular angle and/or direction onto sensor 101, and/or may prevent light from other angles and/or directions from reaching sensor 101. Consequently, tubes 103 may allow each particular sensor 101 to accurately measure the intensity, direction, color, and/or other attributes of light reaching that particular sensor 101 from a different angle and/or direction.

Sensors 101 may be wired to and controlled by processor 105. Processor 105 may activate each sensor 101 to cause the activated sensors 101 to capture and/or measure light reaching the activated sensors 101. Processor 105 may retrieve the values of the captured and/or measured light from each sensor 101. The values may correspond to numerical or quantified measures of brightness, different color components, and/or other visual characteristics.

In some embodiments, processor 105 may tag the output of each sensor 101 with an identifier. The identifier may indicate which sensor 101 generated the output and/or may indicate the angle, direction, and/or other positioning of the sensor 101 about the surface of sensor sphere 100. In some embodiments, the identifier may also include a timestamp for the time at which the output was generated. In some embodiments, the identifier may be dynamically adjusted based on the orientation of sensor sphere 100 and/or to account for any rotation and/or tilting of sensor sphere 100 when sensors 101 are activated and used to take the various measurements.

Processor 105 may be housed within sensor sphere 100 along with one or more of a compass, inertial sensor, orientation sensor, and/or other sensors 107 for determining the pitch, roll, yaw, and/or other positioning of sensor sphere 100. The pitch, roll, yaw, and/or other measurements provided by sensors 107 may be used to determine relative orientation of sensor sphere 100 and/or to determine the adjusted direction, angle, and/or specific positioning of each sensor 101 after accounting for any rotation, tilting, and/or change in the orientation of sensor sphere 100.

Processor 105 may change the identifier that is tagged to each sensor's 101 output based on the determined orientation of sensor sphere 100. In some embodiments, processor 105 may tag each sensor's 101 output with a first identifier that identifies which sensor 101 about the exterior of sensor sphere 100 generated the particular sensor output, and a second identifier that identifies the relative orientation of sensor sphere 100 when the particular sensor output was generated. The second identifier may include a value that is obtained and/or derived from orientation sensor 107.

From the first identifier and the second identifier, processor 105 and/or the rendering system may determine the exact direction and/or angle of the light that produced the particular sensor output and/or the exact direction and/or angle of the sensor 101 that generated the particular sensor output at the time the particular sensor output is generated. For instance, a particular sensor identifier may identify a sensor that is located at the top of sensor sphere 100 and that is pointed directly upward. However, sensor sphere 100 may be rotated by 90 degrees to one side such that the sensor at the top of sensor sphere 100 is rotated to the right side of sensor sphere 100. The second identifier may identify the rotation of sensor sphere 100. Accordingly, when the rendering system references the measurements from sensor sphere 100, the rendering system may map the measurement that is generated by each sensor 101 to an exact angle, direction, and/or orientation based on the first identifier and the second identifier that is associated with the output. Alternatively, processor 105 may dynamically adjust the identifier that is output by each sensor 101 to account for the rotation, and to identify the exact direction and/or angle of the light that produced the output.

Sensors 107 may further include one or more of an accelerometer, altimeter, and/or geolocation sensor. The accelerometer may detect when sensor sphere 100 is being moved within a scene, the velocity of movement, and/or the direction of movement. The altimeter may specify the height of sensor sphere 100 in a scene when measuring the light within the scene. The geolocation sensor may include a Global Positioning System ("GPS") chip for identifying the physical position of sensor sphere 100 in the scene. The height and positioning data may be used by processor 105 to adjust one or more light measurements taken by sensors 101, or to more accurately map the placement and/or visual characteristics of different light sources within the scene.

Sensor sphere 100 may further include one or more of a memory or storage 109 for storing the sensor output, wireless radio 111 for transmitting the sensor output to another device and/or remotely configuring operation of sensor sphere 100, physical interface 113 for connecting another device to sensor sphere 100 in order to read out the sensor output and/or configure operation of sensor sphere 100, and power source 115 for powering sensor sphere 100 (e.g., processor 105 and sensors 101). In some embodiments, power source 115 may include a battery or a wire for connecting sensor sphere 100 to a power outlet.

Sensor sphere 100 may also include mounting bracket 117. In some embodiments, mounting bracket 117 may include threading for screwing sensor sphere 100 onto a pole, stand, and/or other coupler. In some embodiments, mounting bracket 117 may include a coupling interface for attaching sensor sphere 100 to another object. Mounting bracket 117 may be used to elevate sensor sphere 100 off the ground. In particular, mounting bracket 117 may be used to place sensor sphere 100 at a desired height and/or position within a 3D environment or scene, and to capture the light and/or other visual characteristics of the 3D environment or scene at the different angles of sensors 101 from the desired height and/or position. In some embodiments, mounting bracket 117 may be used to attach sensor sphere 100 to a drone, tracks, or some moveable rig or device so that sensor sphere 100 may be moved within a 3D space along a same path as a camera or to track the field-of-view of a moving scene. In some such embodiments, sensor sphere 100 may capture lighting and/or other visual characteristics of the 3D environment from different angles and from different positions, wherein the measurements taken by sensor sphere 100 may be used to accurately illuminate a digitally inserted object that moves within 3D environment along the same path as sensor sphere 100.

In some embodiments, sensor sphere 100 may be controlled by a remote device that is connected via a wired connection or wireless connection to sensor sphere 100. For instance, the remote device may include a smartphone device, a laptop computer, a tablet, and/or other computing device for activating, deactivating, configuring, reading output, and/or otherwise controlling operation of sensor sphere 100.

Sensors 101 may require calibration prior to a first use or upon initializing sensor sphere 100. Calibration of sensors 101 may include placing sensor sphere 100 before a single light source, and setting sensor sphere 100 in a calibration mode. A user may rotate sensor sphere 100 or may mount sensor sphere 100 onto a mechanized rotating base or platform via mounting bracket 117. As sensor sphere 100 rotates and different sets of sensors 101 move in front of the single light source, the different sets of sensors 101 may obtain light measurements. Processor 105 may compare the light measurements obtained by sensors 101 that have a similar positioning and/or angle about the surface of sensor sphere 100, and may calibrate or adjust those sensors 101 to generate a similar or matching set of measurements when rotated to a particular position before the single light source.

Processor 105 may account for the curvature, positioning, and/or angles of different sensors 101 during calibration.

The calibration may further include changing the position of the single light source from a first position to a second position, rotating sensor sphere 100 with the light source at the second position, comparing the light measurements obtained by different sensors 101 that have a similar positioning and/or angle about the surface of sensor sphere 100 and that are moved in front of the light source at the second position, and may calibrate or adjust those sensors 101 to generate a similar or matching set of measurements when rotated to a particular position before the single light source.

For instance, the light source may be first positioned about a right or left side of sensor sphere 100, sensor sphere 100 may be rotated, and a first set of sensors 101 about the sides of sensor sphere 100 with a −45 to 45 degree angle may be calibrated. The light source may be moved to a second position above sensor sphere 100, sensor sphere 100 may be rotated, and a second set of sensors 101 about the top of sensor sphere 100 with a 45 to 135 degree angle may be calibrated. The light source may be repositioned or the rotation of sensor sphere 100 may be changed until all sensors 101 are calibrated to produce similar measurements when receiving similar light.

Figure 2:
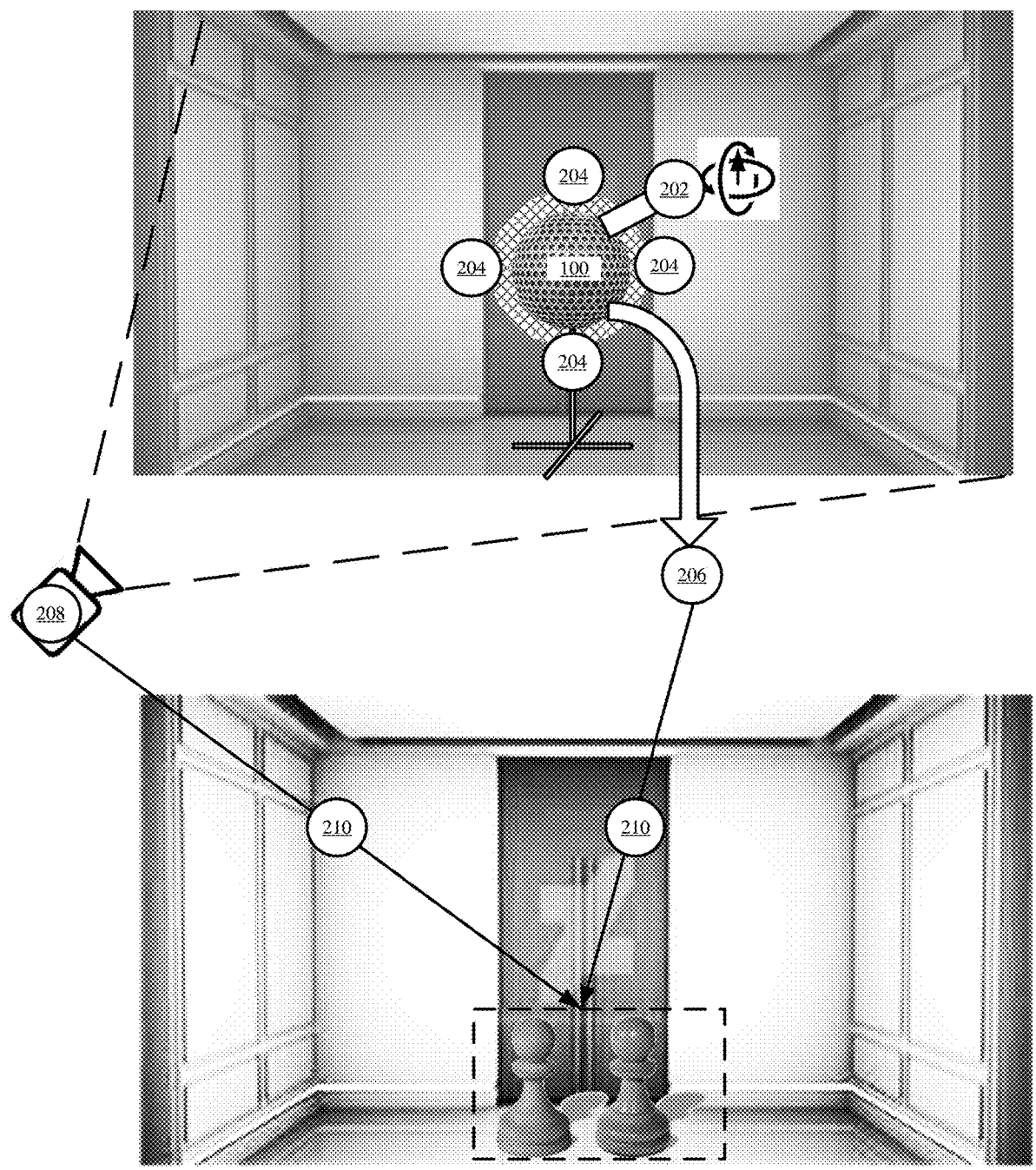
FIG. 2 illustrates using the sensor sphere to capture lighting, shading, coloring, and/or other visual characteristics from different angles in accordance with some embodiments presented herein.

FIG. 2 illustrates using sensor sphere 100 to capture lighting, shading, coloring, and/or other visual characteristics from different angles in accordance with some embodiments presented herein. As shown in FIG. 2, sensor sphere 100 may be placed at a particular position with a particular orientation in a 3D environment. In some embodiments, sensor sphere 100 may be placed at the center point of the 3D environment prior to, during, or after imaging the 3D environment with a camera that is centered on the center point.

Sensor sphere 100 may use compass, accelerometer, altimeter, inertial sensor, orientation sensor, geolocation sensor, and/or other sensors 107 to determine (at 202) its particular orientation, height, and/or positioning within the 3D environment. Specifically, sensor sphere 100 may use the particular orientation to map the position of each sensor 101, and/or to determine the different angle and/or direction of each sensor 101 with sensor sphere 100 in the particular orientation. For instance, a particular sensor 101 may be positioned at the top of sensor sphere 100 with an upwards orientation. However, sensors 107 may determine that sensor sphere 100 has been rotated 180 degrees such that the particular orientation of sensor sphere 100 is upside-down. Consequently, processor 105 may use the particular orientation of sensor sphere 100 to remap the position of the particular sensor 101 to be at the bottom of sensor sphere 100 with a downwards orientation.

Sensor sphere 100 may activate sensors 101. In response to activating sensors 101, each sensor 101 may measure (at 204) the light reaching sensor sphere 100 from the determined angle and/or direction of that sensor 101. Once again, tubes 103 may allow each sensor 101 to precisely measure (at 204) the light coming in at the particular angle and/or direction of sensor 101 without pollution by light from other angles and/or directions.

Measuring (at 204) the light may include obtaining one or more of luminance, chrominance, red, green, blue, and/or other visual characteristic measurements, and/or outputting a set of values that quantify each of the visual characteristic measurements. In some embodiments, measuring (at 204) the light may include measuring properties of visible and non-visible light (e.g., infrared light). Additionally, measuring (at 204) the light may include measuring light that is emitted from a light source or light that is reflected off of a reflective surface. The measurements obtained by each sensor 101 may vary by different degrees based on the variance of the light (e.g., intensity, color, and/or other properties) reaching different points on sensor sphere 100 where sensors 101 are located. In some embodiments, sensors 101 may capture values for individual color components of light (e.g., red, green, and blue color components), and may derive other values such as luminance or intensity based on the values for the individual color components. To identify the angle and/or direction at which each measurement was taken, the output from each sensor 101 may be tagged with one or more identifiers that correspond to the angle and/or direction of that sensor 101 with sensor sphere 100 having the particular orientation. The measurements from sensors 101 may also be tagged with a timestamp to identify the time at which the measurements were taken.

In some embodiments, processor 105 and/or a rendering system may combine and/or process the output from sensors 101 in order to accurately capture the direction, intensity, coloring, and/or other properties of the light used to illuminate the 3D environment from several different angles. In particular, the combined output from sensors 101 may be used to determine the number and type (e.g., spot, area, point, directional, volume, ambient, etc.) of distinct light sources illuminating the 3D environment, and/or specific attributes of each light source (e.g., intensity, tone, brightness, color, etc.).

Once the lighting information is captured using sensor sphere 100, a user may remove (at 206) sensor sphere 100 from the 3D environment. The user may then image (at 208) the 3D environment using one or more cameras that may be centered on the particular position where sensor sphere 100 was previously located. The cameras may capture the 3D environment using the same light that was measured and recorded by sensor sphere 100.

In some embodiments, the cameras may generate a 3D image of the 3D environment or a 3D object within the environment. For instance, multiple images of the 3D environment may be taken from different positions around the 3D environment or from different camera orientations, and the multiple images may be processed together to produce a singular 3D image or point cloud of the 3D environment. Alternatively, the cameras may image the 3D environment with depth information, and the depth information may be used to convert the image into a 3D model.

The output of sensors 101 and/or sensor sphere 100 may be used as lighting points of reference by which to directly edit (at 210) or enhance the 3D environment rendering. For example, the light measurements taken by sensors 101 may be referenced in order to digitally insert an object into the 3D environment, and to accurately light each angle of the object based on the corresponding measurements obtained by sensor sphere 100 for those angles. As another example, the light data captured by sensor sphere 100 may be referenced to accurately adjust lighting of the 3D environment when postprocessing an image or rendering of the 3D environment from different angles or with adjusted light properties. More specifically, the direct editing and/or lighting adjustment may include determining the position, direction, angle, and/or orientation by which a virtual camera is to present an object in the 3D environment, and the rendering system of some embodiments may select the output from the one or more sensors 101 that measured the light in the 3D environment at the same position, direction, angle, and/or orientation, and may adjust the illumination of the object according to the measured light data from those one or more sensors 101 without computationally intensive ray-tracing or mirror ball unstitching and mapping.

In some embodiments, the cameras may generate a point cloud representation of the 3D environment. The point cloud representation may include a set of data points for representing a 3D or volumetric object and/or environment. The point cloud data points may differ from pixels of a two-dimensional ("2D") image, because certain regions of the point cloud may have no data points, lower densities of data points, and/or higher densities of data points based on varying amounts of visual information that is detected at those regions. In contrast, pixels of a 2D or 3D image may have a uniform density and fixed arrangement that is defined by the resolution of that image. Moreover, the point cloud data points may have a non-uniform placement or positioning, whereas the 2D or 3D image may have pixel data for each pixel of a defined resolution (e.g., 640×480, 800×600, etc.).

Each point cloud data point may include positional and non-positional information. The positional information may include coordinates within 3D space. For instance, each point cloud data point may include x-coordinate, y-coordinate, and z-coordinate data point elements that map to different x-coordinate, y-coordinate, and z-coordinate locations across the imaged object or 3D environment. The non-positional data point elements may store the visual characteristics at a corresponding position of each data point in or on the object and/or 3D environment. In some such embodiments, the output of sensors 101 and/or sensor sphere 100 may be used as lighting points of reference by which to directly edit (at 210) lighting, shading, coloring, and/or other visual characteristics of specific data points of the point cloud.

FIG. 2 illustrates a use case in which sensor sphere 100 is used to measure light properties and/or other visual characteristics of a 3D environment before or after the 3D environment is imaged with a camera or another imaging device. When the scene includes a sunrise or sunset, the light and/or other visual characteristics of the exact same 3D environment may change from when the light is measured with sensor sphere 100 to when the scene is imaged with a camera. In other words, the lighting data measured by sensor sphere 100 may not exactly match the lighting that exists when the object and/or 3D environment is imaged.

A similar issue may exist when filming a scene over a period of time and/or moving the camera when imaging the 3D environment. In such cases, light measurements taken by sensor sphere 100 from a single position may be insufficient to identify the full dynamic range of light affecting the 3D environment over the period of time and/or at the different camera positions.

Figure 3:
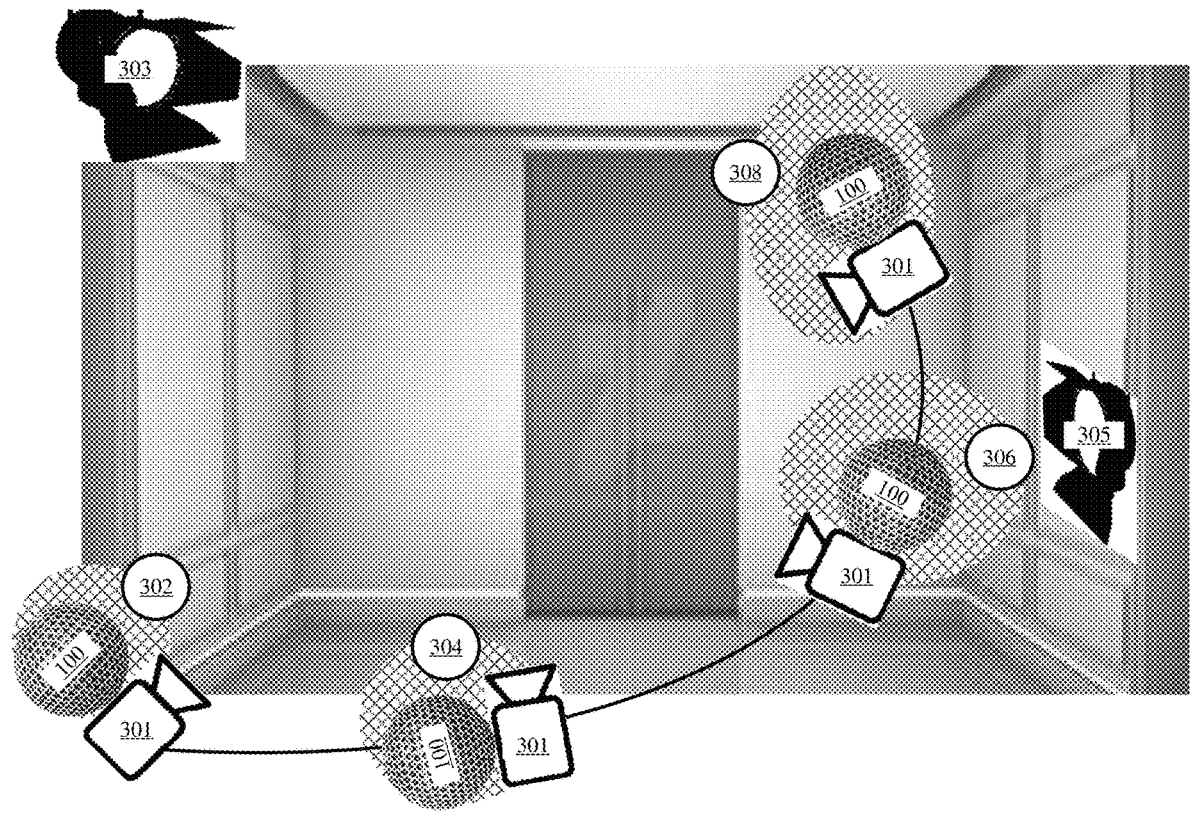
FIG. 3 illustrates an example of using the sensor sphere to measure light in a three-dimensional ("3D") environment as each image or each frame of the 3D environment is generated in accordance with some embodiments presented herein.

Accordingly, in some embodiments, sensor sphere 100 may measure the light as the 3D environment is being filmed or imaged, and/or may measure the light from the corresponding position of the camera that is used to image the 3D environment. FIG. 3 illustrates an example of using sensor sphere 100 to measure light in a 3D environment as each image or each frame of the 3D environment is generated in accordance with some embodiments presented herein.

As shown in FIG. 3, sensor sphere 100 may be mounted atop camera 301. Camera 301 may be moved within a 3D environment to film or image the 3D environment from different positions and/or angles. The environment may include two light sources 303 and 305 that illuminate 3D environment with different types of lights and/or from different positions, directions, and/or angles within 3D environment.

Sensor sphere 100 may be configured to activate and measure (at 302, 304, 306, and 308) light on a periodic basis or as the camera is moved. For instance, an accelerometer of sensor sphere 100 may detect camera movement, and may perform (at 302, 304, 306, and 308) a light measurement using sensors 101 each time camera 301 moves a threshold distance. Sensor sphere 100 may directly measure the light that is emitted from light sources 303 and 305 even when light sources 303 and 305 are outside camera's 301 field-of-view.

FIG. 3 illustrates different sets of sensors 101 that receive light from light sources 303 and 305 at the different positions and/or times when measurements are performed (at 302, 304, 306, and 308). However, it should be noted that each sensor 101 may perform a measurement at each of the identified positions and/or times, and may produce output for the color, intensity, and/or other properties of light in the direction and/or angle of that sensor 101 when each measurement is taken and/or each sensor 101 is activated.

As noted above, sensor sphere 100 may also supplement the direct light measurements at each sensor 101 with derived measures. For instance, processor 105 and/or a rendering system may process the output from each sensor 101 at each activation in order to determine where light sources 303 and 305 are exactly located in the 3D environment, and/or the different intensity, luminance, color, and/or other visual characteristics of each light source 303 and 305 that may otherwise blend together when capturing just the illumination of the 3D environment and/or individual objects within the 3D environment.

Figure 4:
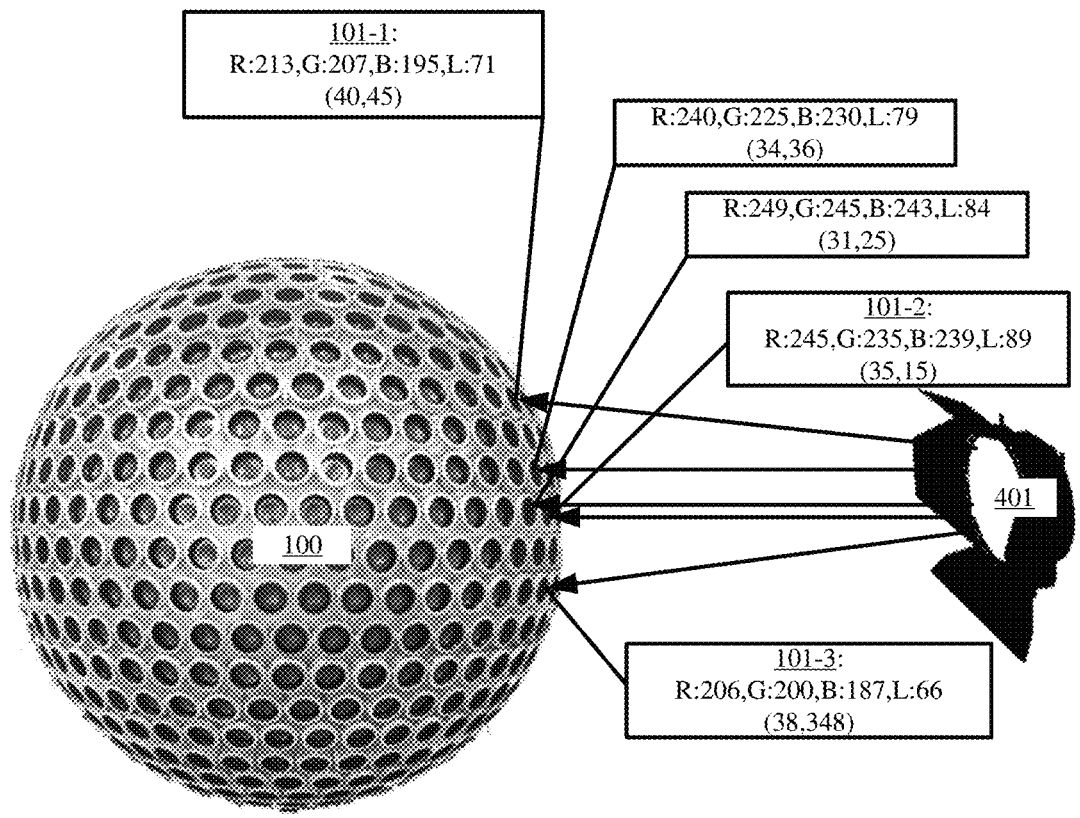
FIG. 4 illustrates example output produced by different sensors of the sensor sphere in accordance with some embodiments presented herein.

FIG. 4 illustrates example output produced by different sensors 101 of sensor sphere 100 in accordance with some embodiments presented herein. FIG. 4 illustrates one light source 401 emitting spot lighting that illuminates a subset of sensors 101. Each of the subset of sensors 101 may receive a different amount of light based on the angle and/or direction of the subset of sensors 101 relative to light source 401. In particular, each tube 103 of a corresponding sensor 101 may allow that sensor 101 to receive the particles and/or waves of light that pass at the angle and/or direction of that tube 103.

Each sensor 101 may measure red, green, and blue ("RGB") components of the light reaching that sensor 101. For instance, first sensor 101-1 in the subset of sensors 101 may measure RGB values of 213, 207, and 195 respectively, second sensor 101-2 in the subset of sensors 101 may measure RGB values of 245, 235, and 239 respectively, and third sensor 101-3 in the subset of sensors 101 may measure RGB values of 206, 200, and 187 respectively. In some embodiments, each sensor 101 may be configured to measure other properties of visible and non-visible light.

Luminance (illustrated in FIG. 4 as "L:"), chrominance, and/or measures of other light properties (e.g., intensity, brightness, etc.) may be derived from the RGB components of a single sensor 101 or multiple sensors 101. For instance, the sum of the RGB values measured by a particular sensor 101 may be used to compute the luminance detected in the direction and/or angle of the particular sensor 101. In some embodiments, each sensor 101 may output the measured RGB values and/or other derived values such as the luminance, brightness, and/or tone.

Each sensor output may include an array of values with each value corresponding to a different measure for a different light property (e.g., RGB values, luminance value, chrominance value, etc.). Additionally, each sensor output may include a sensor identifier. The sensor identifier may be a unique value for each sensor 101 of sensor sphere 100.

In some embodiments, processor 105 may dynamically adjust or add to the sensor identifier in order to identify the exact direction, angle, orientation, and/or other positioning information for a sensor 101 such that the sensor identifier may identify the direction and/or angle of light reaching the identified sensor 101. In some such embodiments, processor 105 may generate sensor identifiers with x, y, and z positional coordinates about a volume or sphere represented by sensor sphere 100, and/or may generate sensor identifiers with a first angle or position about an x-axis and a second angle or position about a y-axis.

To generate the dynamically adjusted sensor identifiers, processor 105 may determine an orientation of sensor sphere 100 from one or more of compass, accelerometer, inertial sensor, and/or orientation sensor, and/or other sensors 107. Processor 105 may then receive output that is generated by a particular sensor 101 identified by a unique identifier. Processor 105 may map the unique identifier to a specific position about the exterior of sensor sphere 100, and may adjust the specific position according to the orientation of sensor sphere 100.

For instance, FIG. 4 illustrates the output of first sensor 101-1 having a first identifier with a first angle and a second angle. The first angle of 40 degrees may correspond to an x-axis position of first sensor 101-1, wherein an angle of 0 for the x-axis position may correspond to a frontmost position of sensor sphere 100, an angle of 90 for the x-axis position may correspond to a rightmost position, and an angle of 180 for the x-axis position may correspond to a backmost position. The second angle of 45 may correspond to a y-axis position of first sensor 101-1, wherein an angle of 0 for the y-axis position may correspond to a central position of sensor sphere 100, an angle of 90 for the y-axis position may correspond to a topmost position, and an angle of 270 for the y-axis position may correspond to a bottommost position.

In response to orientation sensors 107 detecting no tilting or rotation of sensor sphere 100, then the output from first sensor 101-1 may be associated with the 40-degree x-axis angle and the 45-degree y-axis angle and/or the sensor identifier of first sensor 101-1 may be left unchanged. Alternatively, the direction and/or angle of first sensor 101-1 may be represented with a sensor identifier having first x-axis, first y-axis, and first z-axis coordinates.

However, in response to orientation sensors 107 detecting a 25-degree rotation about the y-axis, processor 105 may modify the sensor identifier for first sensor 101-1 to account for the detected 25-degree rotation of sensor sphere 100 about the y-axis. In this case, the sensor identifier for first sensor 101-1 may change from (40, 45) to (40, 60) to account for the rotation and/or offset orientation of sensor sphere 100 when first sensor 101-1 generates the output. Alternatively, the modified direction and/or angle adjusted based on the off-axis orientation of sensor sphere 100 may be represented with a sensor identifier having first x-axis, second y-axis, and first z-axis coordinates.

In this manner, sensor sphere 100 may provide an accurate representation of the light illuminating a 3D environment from different angles. Specifically, sensor sphere 100 may provide a 360-degree capture of the light illuminating the 3D environment from a particular point in the 3D environment in which sensor sphere 100 is positioned. From the RGB components detected at each direction and/or angle, sensor sphere 100 and/or a rendering system using the sensor sphere 100 data may identify the number of light sources illuminating the 3D environment, the position of each light source in 3D space, the type of light (e.g., spot, area, point, directional, volume, ambient, etc.), and/or specific attributes of the light (e.g., intensity, tone, brightness, color, etc.).

The output that is generated by sensors 101 and/or by sensor sphere 100 differs from the output that is generated by existing devices and/or cameras. For instance, the output from each sensor 101 comprises a first set of values corresponding to properties of light measured by a particular sensor 101, and a second set of values (e.g., the adjusted sensor identifier) that explicitly provides the specific direction and/or angle at which the particular sensor 101 receives and/or measures the light. The second set of values are retained with the first set of values generated by each sensor 101 to simplify the attribution of light from any selected direction and/or angle to an object or 3D environment being rendered from that same selected direction and/or angle.

In some embodiments, sensor sphere 100 may output the lighting data collected by sensors 101 to a file. In some embodiments, the lighting data collected by sensors 101 may be added as metadata to image data that is generated by a camera when sensor sphere 100 is mounted and/or connected to the camera, the camera is used to capture images of a particular 3D environment, and sensor sphere 100 is used to collect the lighting data for the same particular 3D environment. The metadata may include fields that are manually populated by a user to identify any of the light type (e.g., incandescent, fluorescent, light emitting diodes ("LEDs")), light source make and model, age of the light source, light brand, diffusers, light gels, scrims, honeycombs, and/or other identifying information.

The lighting data collected by sensors 101 may be input into a rendering system. The rendering system may use the lighting data from sensor sphere 100 to produce efficient and accurate photorealistic lighting, shading, coloring, and/or other visual effects when rendering a 3D environment or point cloud, when digitally inserting new objects into the 3D environment or point cloud, when editing the 3D environment or point cloud, and/or when rendering the 3D environment or point cloud from viewpoints that may be different than the viewpoint of the camera used to capture the 3D environment or point cloud. Specifically, the rendering system may directly apply visual and/or lighting effects to select point cloud data points, an object in a 3D scene, and/or a 3D environment from different perspectives and/or angles based on a direct mapping and/or application of the lighting data that is captured from those same perspectives and/or angles by sensor sphere 100.

Figure 5:
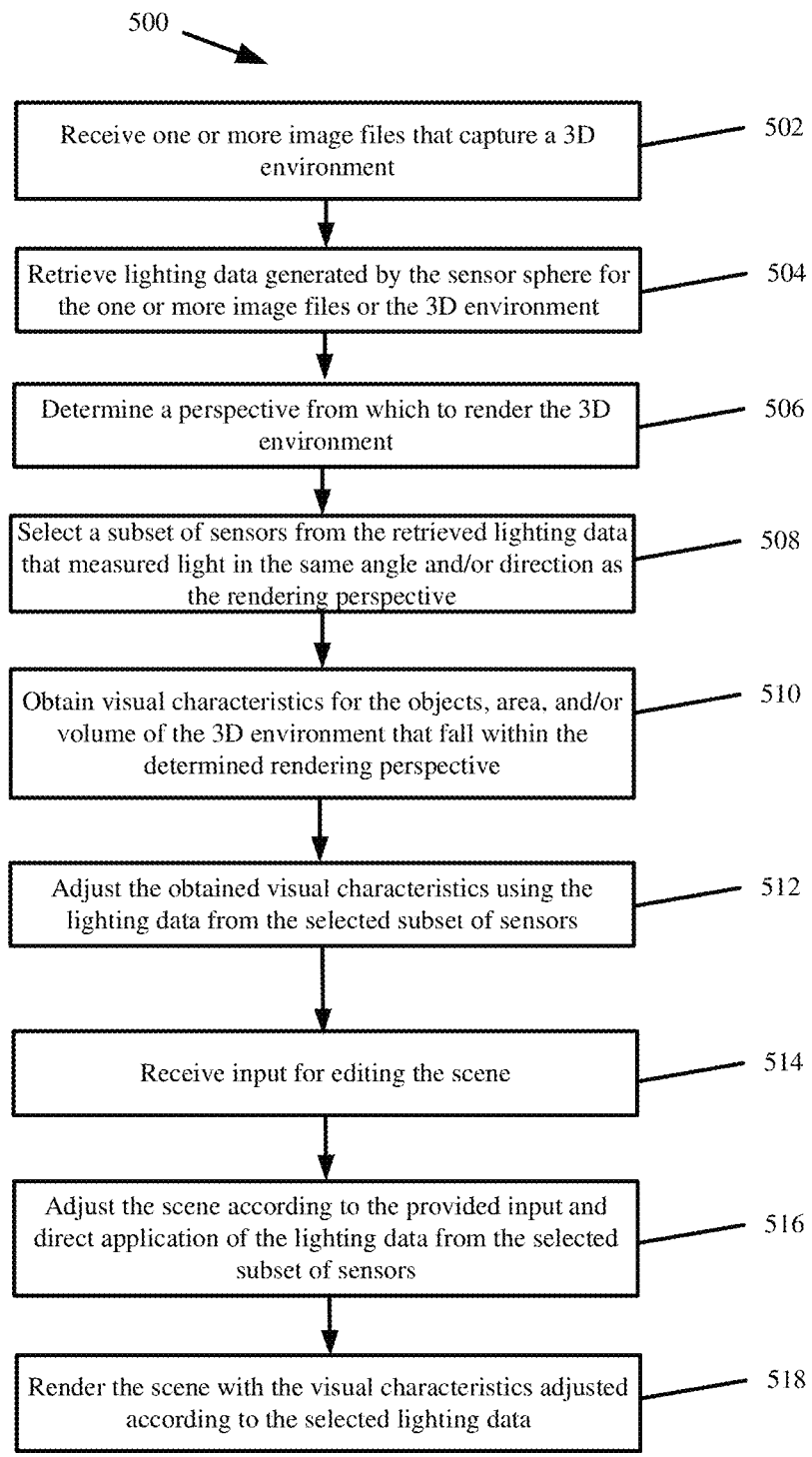
FIG. 5 presents a direct light mapping process for efficiently and accurately rendering a point cloud or 3D scene with photorealistic light using the lighting data from the sensor sphere in accordance with some embodiments presented herein.

FIG. 5 presents a direct light mapping process 500 for efficiently and accurately rendering a point cloud or 3D scene with photorealistic light using the lighting data from sensor sphere 100 in accordance with some embodiments presented herein. Process 500 may be implemented by a rendering system that renders 2D and/or 3D images or environments. The rendering system may be configured to execute on one or more processors of one or more compute devices.

Process 500 may include receiving (at 502) one or more image files. The one or more image files may store image data associated with a point cloud, one or more objects, and/or a 2D or 3D environment. In particular, the one or more image files may include files that are generated by cameras, and/or files that contain data for digitally creating or presenting a 3D environment via point cloud data points, 3D models of objects, voxels, primitives, an environment map, and/or constructs from which to render a 3D visualization.

Process 500 may include retrieving (at 504) lighting data that is generated by sensor sphere 100 for the one or more image files or the 3D environment contained in the one or more image files. In some embodiments, the lighting data may be stored as one or more files in the same folder as the image files, or may be embedded as part of the image files. In some other embodiments, the lighting data may include identifiers and/or metadata for defining a link to the image files or vice versa. For instance, the lighting data identifiers may include timestamps for when the lighting data was generated and/or positional information for where the lighting data was generated. The identifiers may be matched to similar identifiers from the image files in order to identify the correct lighting data for the different captures of a 3D environment.

Process 500 may include determining (at 506) a perspective from which to render the 3D environment contained encoded by the one or more image files. Determining (at 506) the perspective may include identifying a position and/or orientation (e.g., angle and/or direction) of a camera and/or viewpoint from which to render the point cloud, object, or 3D environment of the one or more image files.

Process 500 may include selecting (at 508) a subset of sensors 101 from the retrieved (at 504) lighting data. In particular, process 500 may include selecting (at 508) the subset of sensors 101 that measured light in the same angle and/or direction as the rendering perspective or camera angle and direction. In other words, the rendering system may select (at 508) the light measurements that were generated by the subset of sensors that received light in the same angle and/or direction as the camera, or in the same angle and/or direction as the object, area, or volume of the 3D environment that is to be rendered from the camera perspective.

In some embodiments, the selection (at 508) of the subset of sensors 101 may be dependent on the position of sensor sphere 100 relative to the camera position. For instance, the rendering system may select (at 508) sensors 101 that have an angle and/or direction in the camera's field-of-view when the lighting data was captured with sensor sphere 100 being positioned in the field-of-view of the camera that imaged the 3D environment, or may select (at 508) sensors 101 that have the same angle and/or direction as the camera when the lighting data was captured with sensor sphere 100 being mounted on the camera that imaged the 3D environment.

Figure 6:
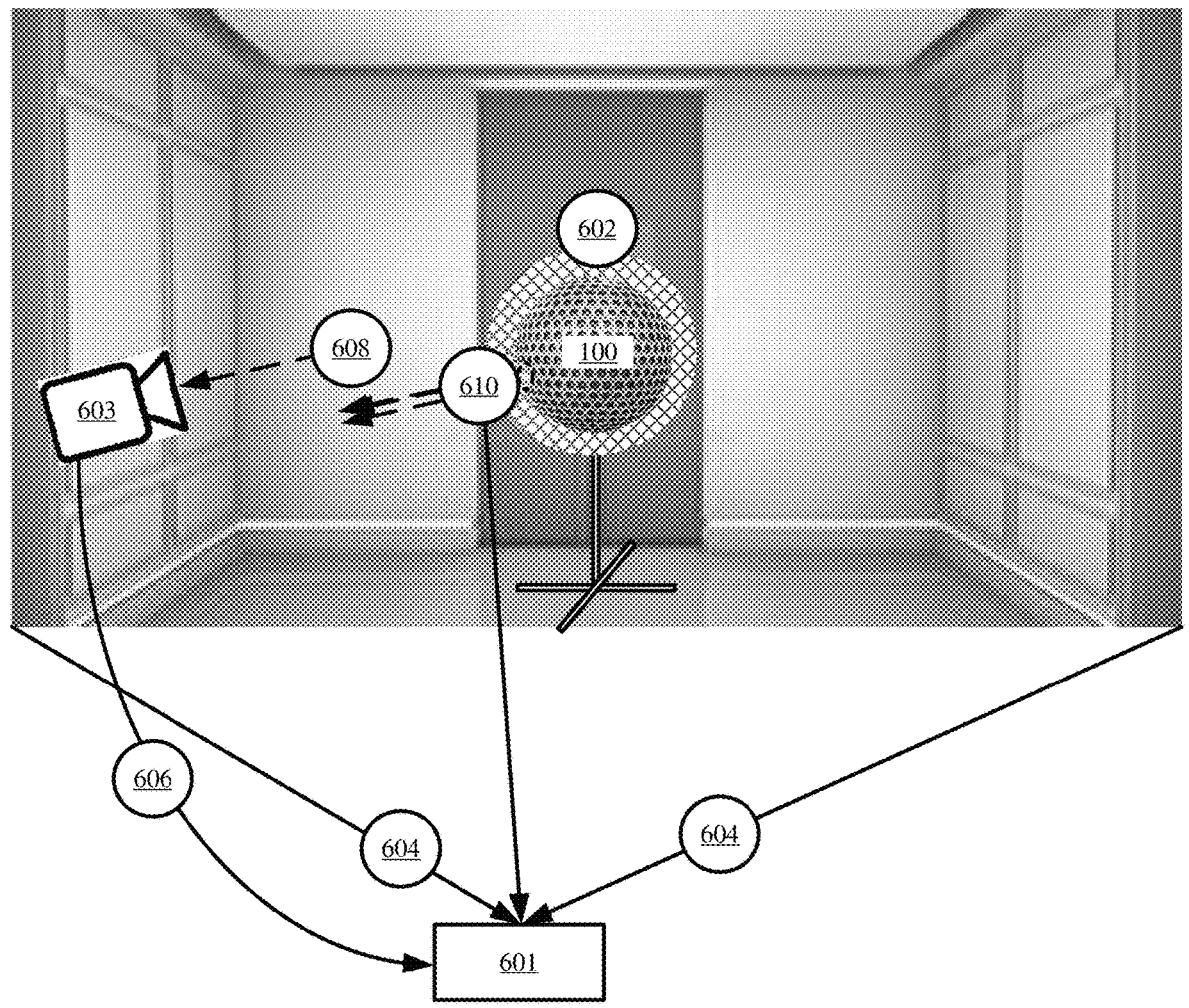
FIG. 6 illustrates an example of selecting lighting data from a subset of sensors that have an angle and/or direction in the camera's field-of-view in accordance with some embodiments presented herein.

FIG. 6 illustrates an example of selecting lighting data from a subset of sensors 101 that have an angle and/or direction in the camera's field-of-view in accordance with some embodiments presented herein. At a first time, sensor sphere 100 may measure (at 602) lighting data from a central position within a 3D environment. Specifically, the lighting data measured (at 602) by sensor sphere 100 may include different output from sensors 101 that measure the light reaching the central position from different angles and/or directions.

Thereafter, sensor sphere 100 may be removed from the 3D environment, and the 3D environment may be imaged using one or more cameras. Rendering system 601 may receive (at 604) the image files for the 3D environment, and may receive (at 606) user input for rendering the 3D environment from a different (e.g., non-central) position of camera 603. Camera 603 may correspond to a digital camera or viewpoint from which to render, recreate, generate, and/or present the 3D environment.

Rendering system 601 may determine (at 608) the direction and angle of image data entering the camera 603 field-of-view. For instance, rendering system 601 may determine (at 608) the direction and angle of a straight line from the 3D environment into the center of camera 603.

Rendering system 601 may select (at 610) the lighting data that is measured by a subset of sensors in the same direction and angle as the straight line and/or within a threshold of the direction and angles of the straight line. Rendering system 601 may use the lighting data from the selected (at 610) subset of sensor to illuminate the 3D environment and/or objects falling in the field-of-view of camera 603 at the configured position and/or orientation.

Figure 7:
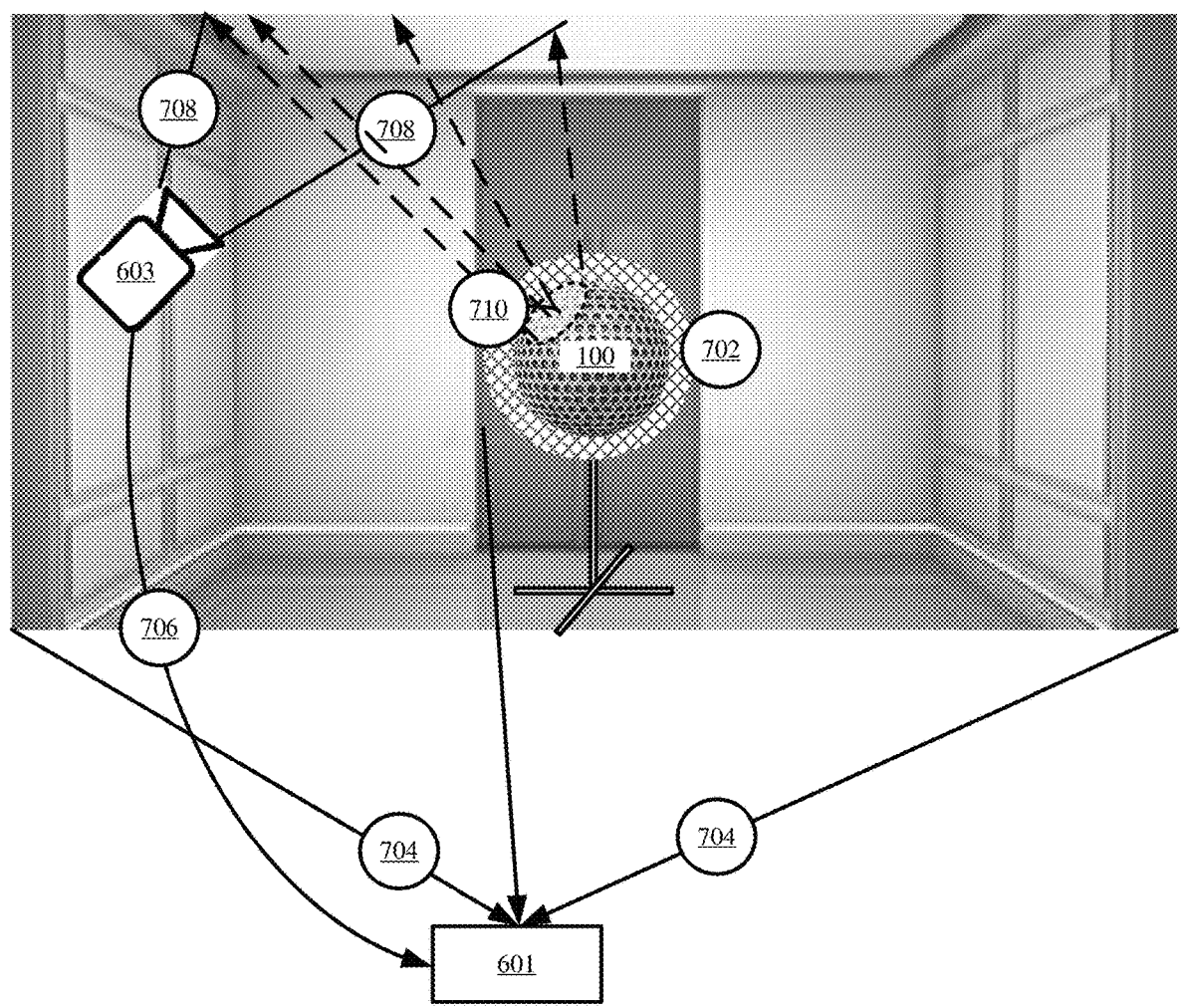
FIG. 7 illustrates an example of selecting lighting data from a subset of sensors that measure light of an object and/or volume that is to be rendered by a rendering system in accordance with some embodiments.

FIG. 7 illustrates an example of selecting lighting data from a subset of sensors 101 that measure light of an object and/or volume that is to be rendered by rendering system 601 in accordance with some embodiments. Here again, sensor sphere 100 may measure (at 702) lighting data from a central position within a 3D environment.

Rendering system 601 may receive (at 704) the image files for the 3D environment, and may receive (at 706) user input that orients camera 603 away from sensor sphere 100. In this case, rendering system 601 may determine (at 708) the area, volume, or portion of the 3D environment falling within camera's 603 field-of-view. For instance, rendering system 601 may determine (at 708) the coordinates for any objects within camera's 603 field-of-view.

Rendering system 601 may select (at 710) the lighting data from a subset of sensors that measure the lighting in the area, volume, or portion of the 3D environment falling within camera's 603 field-of-view. Rendering system 601 may use the lighting data from the selected (at 710) subset of sensors to illuminate the 3D environment and/or objects falling in the field-of-view of camera 603 at the configured position and/or orientation.

Figure 8:
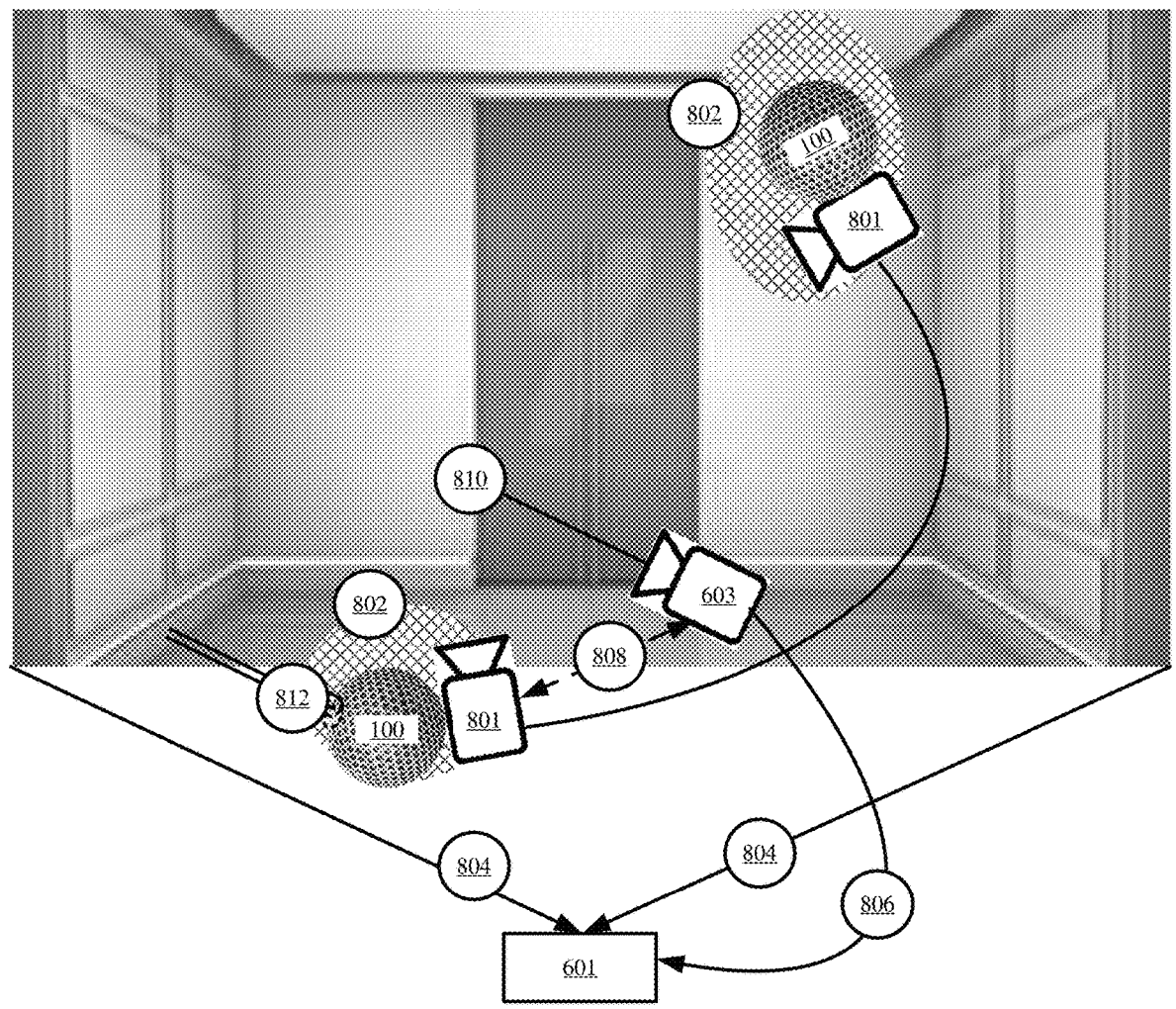
FIG. 8 illustrates an example of selecting lighting data from a subset of sensors with a direction and/or angle that are aligned with the direction and/or angle of a camera in accordance with some embodiments presented herein.

FIG. 8 illustrates an example of selecting lighting data from a subset of sensors 101 with a direction and/or angle that are aligned with the direction and/or angle of camera 603 in accordance with some embodiments presented herein. FIG. 8 illustrates sensor sphere 100 being mounted to a physical camera 801. Camera 801 may capture different images of a 3D environment from different positions in order to produce a composite 3D rendering of the 3D environment. Sensor sphere 100 may measure (at 802) the light from different angles at the different positions at which camera 801 captures the 3D environment images.

Rendering system 601 may receive (at 804) the image files for the 3D environment, and may receive (at 806) user input that positions and orients camera 603 within the 3D environment. Rendering system 601 may identify (at 808) the lighting data that was measured when sensor sphere 100 was closest to the position of camera 603.

Rendering system 601 may determine (at 810) the direction and angle for the viewing perspective of camera 603. In other words, rendering system 601 may determine (at 810) the direction and angle from which to render the 3D environment. Rendering system 601 may then select (at 812) a subset of lighting data that was measured by a subset of sensors in the same direction and angle as camera 603 from the lighting data that measured when sensor sphere 100 was closest to the position of camera 603.

With reference back to FIG. 5, process 500 may include obtaining (at 510) lighting, shading, coloring, and/or other visual characteristics for the objects, area, and/or volume of the 3D environment that fall within the determined (at 506) rendering perspective (e.g., the camera's field-of-view). In particular, the rendering system may obtain the visual characteristics from the one or more image files. The visual characteristics of a particular scene from the one or more image files may not accurately represent the visual characteristics of the same particular scene when viewing the particular scene from a different perspective (e.g., the rendering perspective corresponding to the position, direction, angle, and/or orientation of the camera and/or viewpoint from which to render the 3D environment). The difference and/or inaccuracies in the visual characteristics may be due to the difference in lighting when viewing the same particular scene from different perspectives.

Accordingly, process 500 may include adjusting (at 512) the obtained (at 510) visual characteristics using the lighting data from the selected (at 508) subset of sensors 101. Adjusting (at 512) the visual characteristics may include determining a variance in the lighting at a first position, from which the scene was originally captured and/or imaged, and a different second position at which the same scene is to be rendered from a different perspective (e.g., different position, angle, orientation, direction, etc.), and modifying the lighting, shading, coloring, and/or other visual characteristics of the scene based on the determined variance. In some embodiments, adjusting (at 512) the visual characteristics may include directly applying the difference in light and/or other properties (e.g., tone, color, type of light, etc.) measured at the first position and the second position to the point cloud data points, voxels, primitives, pixels, and/or data of the scene. For instance, adjusting (at 512) the visual characteristics may include increasing the brightness of the scene when the scene is rendered from a perspective that receives more light than the position at which the scene was imaged, wherein the amount with which to increase the brightness of the scene may be determined based on a difference of brightness measured by a first set of sensors of sensor sphere 100 receiving light in the original direction and/or angle at which the scene is imaged, and a second set of sensors of sensor sphere 100 receiving light in the different direction and/or angle of the camera from which the scene is to be rendered. Adjusting (at 512) the visual characteristics may also include adjusting visual effects such as shadows, shading, and/or other lighting effects in response to the determined variance.

Process 500 may include receiving (at 514) input for editing the scene. For instance, a user may digitally insert an object into the scene that was not present when the scene was imaged. Alternatively, a user may adjust certain visual characteristics of the scene for a desired effect.

In response to the input, process 500 may include adjusting (at 516) the scene according to the provided input and the selected (at 508) lighting data. For instance, the rendering system may illuminate a digitally inserted object based on the lighting data that is angled and/or directed towards the digitally inserted object. Additionally, the input may include reducing a particular color component or decreasing color contrast, and the rendering system may reduce the particular color component or decrease the color contrast and make other adjustments based on the lighting data measured by the selected subset of sensors 101.

Process 500 may include rendering (at 518) the scene with the visual characteristics adjusted according to the selected (at 508) lighting data for the selected subset of sensors 101. In this manner, the rendering system may provide a photorealistic presentation of the scene by manipulating lighting, shading, coloring, and/or other visual characteristics via a direct mapping of the actual light, that was present when initially capturing the scene.

The direct mapping to the lighting data from different sensors 101 of sensor sphere 100 greatly reduces the computational effort required to render (at 518) the scene relative to prior art techniques that involve imaging a mirror ball, mapping the lighting data from the imaged mirror ball to corresponding points of the scene, and then adjusting the scene lighting. Moreover, the rendering system achieves a more accurate visualization of the lighting, shading, coloring, and/or other color characteristics of the scene than computationally expensive ray-tracing techniques that rely on digitally inserted lights that may or may not accurately represent the actual lighting that was present when the scene was imaged.

Figure 9:
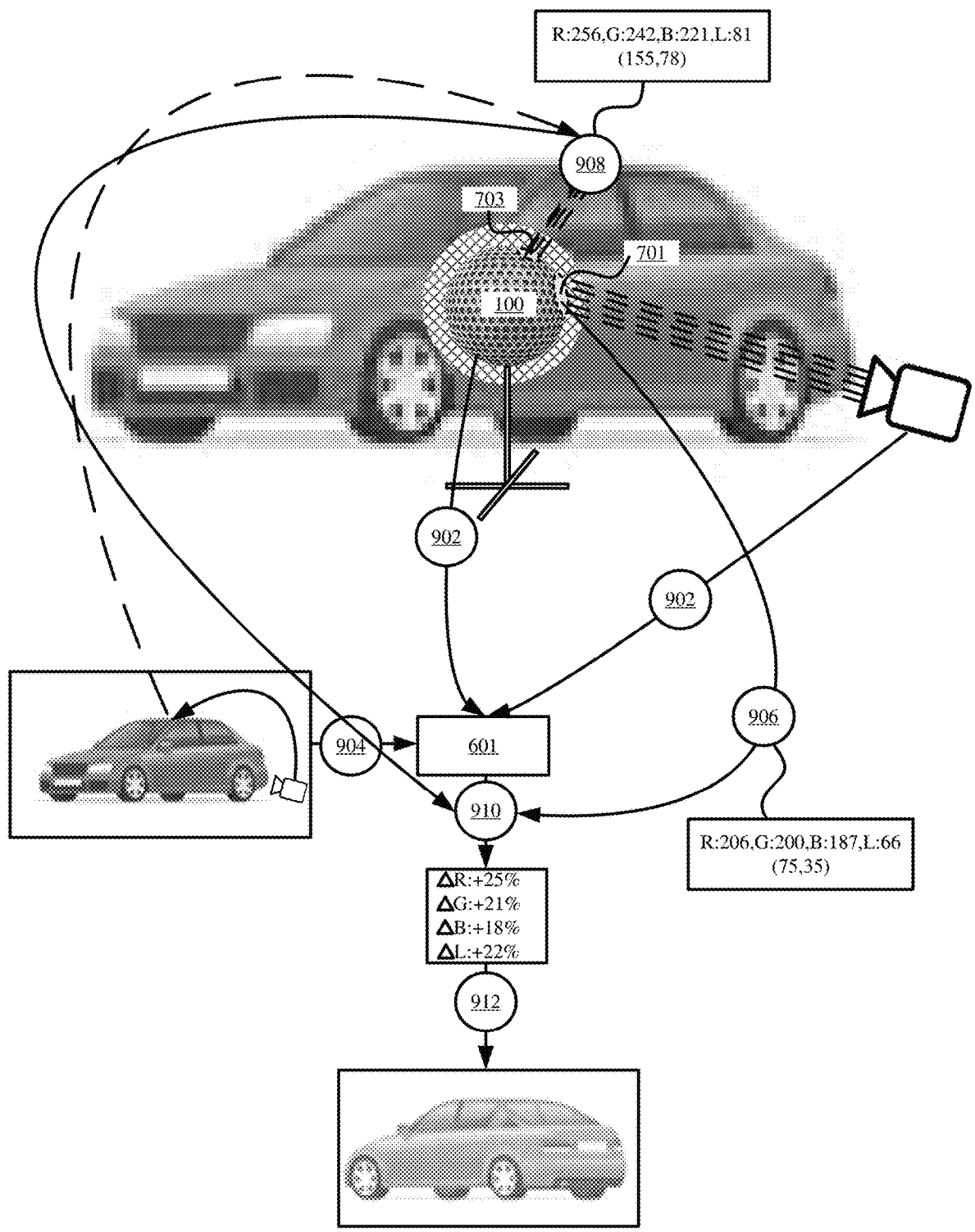
FIG. 9 illustrates a direct light mapping example for efficiently and accurately adjusting visual characteristics of an imaged object using the lighting data from the sensor sphere in accordance with some embodiments presented herein.

FIG. 9 illustrates a direct light mapping example for efficiently and accurately adjusting visual characteristics of an imaged object using the lighting data from sensor sphere 100 in accordance with some embodiments presented herein. An image of the object may be generated based on one or more images that are taken with one or more cameras at one or more different positions. Additionally, sensor sphere 100 may measure light and/or other visual properties illuminating the object from the different angles and/or directions of sensors 101. The measurements may include values for the RGB components, other visible light and non-visible light components, luminance, chrominance, tone, and/or intensity of the light arriving at the different angles and/or directions. Additionally, the measurements may be processed in combination to determine the number, position, direction, and type of light sources that illuminate the 3D scene.

The object image data captured by the one or more cameras, and the lighting data generated for the scene by sensor sphere 100 may be input (at 902) to rendering system 601. A user may interact with rendering system 601 to request (at 904) that the object scene be rendered from a user-defined position and with a user-defined orientation that are different than the positions and/or orientations at which the object was imaged.

To adjust the visual characteristics for rendering the object from the user-defined position and with the user-defined orientation, rendering system 601 may determine (at 906) the lighting data for the original direction and/or angle at which the object was imaged. In particular, rendering system 601 may identify first subset of sensors 701 of sensor sphere 100 that measured light in the original direction and/or angle at which the object was imaged, and may obtain (at 906) the values that were measured by first subset of sensors 701. Additionally, rendering system 601 may determine (at 908) the lighting data reaching the camera and/or illuminating the object from the user-defined position and the user-defined orientation. In particular, rendering system 601 may determine a new direction and/or angle with which to render the object from the user-defined position and the user-defined orientation, may identify second subset of sensors 703 of sensor sphere 100 that measured light in the new direction and/or angle, and may obtain (at 908) the values that were measured by second subset of sensors 703.

Rendering system 601 may compute (at 910) a difference in the values measured by first subset of sensors 701 and the values measured by second subset of sensors 703. As shown in FIG. 9, rendering system 601 may determine that the lighting is 22% brighter at the new direction and/or angle of the object than at the original direction and/or direction. Accordingly, rendering system 601 may render (at 912) the object from the new direction and/or angle using the image data, and may directly adjust the lighting, coloring, shading, and/or other visual characteristics of the image data falling within the field-of-view of the user-defined position and user-defined orientation by the computed (at 910) difference in light properties at the different directions and/or angles. For instance, rendering system 601 may render (at 912) the object from the user-defined position and the user-defined orientation by illuminating the object using the actual light that was measured at the user-defined position and the user-defined orientation rather than the actual light that was captured when imaging the object from the original positions, directions, and/or angles. Although a uniform adjustment is shown in FIG. 9, rendering system 601 may compute (at 910) the difference in light and/or other properties for different point cloud data points, voxels, primitives, and/or other structures from which the rendering is generated, and may apply different adjustments for each such data point, voxel, primitive, and/or other structures.

FIG. 9 is an example of the direct light mapping that is enabled as a result of the different direction and/or angle measurements generated by sensors 101 of sensor sphere 100, and rendering system 601 using the measurements to efficiently and accurately light and render a point cloud, 3D object (e.g., polygons, primitives, and/or other features forming the 3D object), and/or 3D environment from positions, perspectives, and/or angles that are different than the positions, perspectives, and/or angles used to image the point cloud, 3D object, and/or 3D environment. The same operations may be used to efficiently illuminate and render objects that are digitally inserted into the 3D environment with photorealistic and accurate lighting despite the digitally inserted objects lacking any lighting information whatsoever. The direct light mapping involves measuring the actual light that is present in the 3D environment and that comes in the specific direction and/or angle at which the digitally inserted object is to be rendered, and applies the light from that specific direction and/or angle to the digitally inserted object as if the digitally inserted object was present when the 3D environment was originally imaged.

The direct light mapping requires fewer computational operations than mapping light, reflections, and/or other visual properties from images of one or more visual effects balls, and also requires fewer computational operations than ray-tracing and other lighting techniques. Moreover, the direct light mapping provides greater lighting and visual effects accuracy than using visual effects balls because each sensor 101 of sensor sphere 100 accurately measures light and/or other properties from a specific direction and/or location, whereas mapping of lighting information from visual effects balls is a lossy process due to the decreased amount of information that is captured when imaging the visual effects balls from a distance, and the mathematical operations required to extract information from the surface of the balls. The direct light mapping also provides greater lighting and visual effects accuracy than ray-tracing and/or other lighting techniques, because the direct light mapping is based on actual light of the imaged 3D environment, and not artificially created lights required for ray-tracing.

In some embodiments, rendering system 601 may use the direct light mapping to provide real-time lighting of a point cloud, object, or 3D environment when previewing, editing, and/or working on that point cloud, object, or 3D environment. Similarly, rendering system 601 may use the direct light mapping when working with video and different frames of the video requiring lighting adjustments. The direct light mapping may allow an editor to immediately visualize effects when rendering the video from different perspectives or when adjusting the lighting.

However, for a final rendering or presentation of a point cloud, object, 3D environment, or video, rendering system 601 may perform a different light source illumination and/or rendering. The light source illumination may further increase the accuracy and photorealism of the final rendering relative to the direct light mapping rendering, because the light source illumination may use greater variation in light when rendering a point cloud, object, or 3D environment than is used when rendering based on the measurements obtained from the subset of sensors that are in the same direction and/or angle of the scene being rendered.

Figure 10:
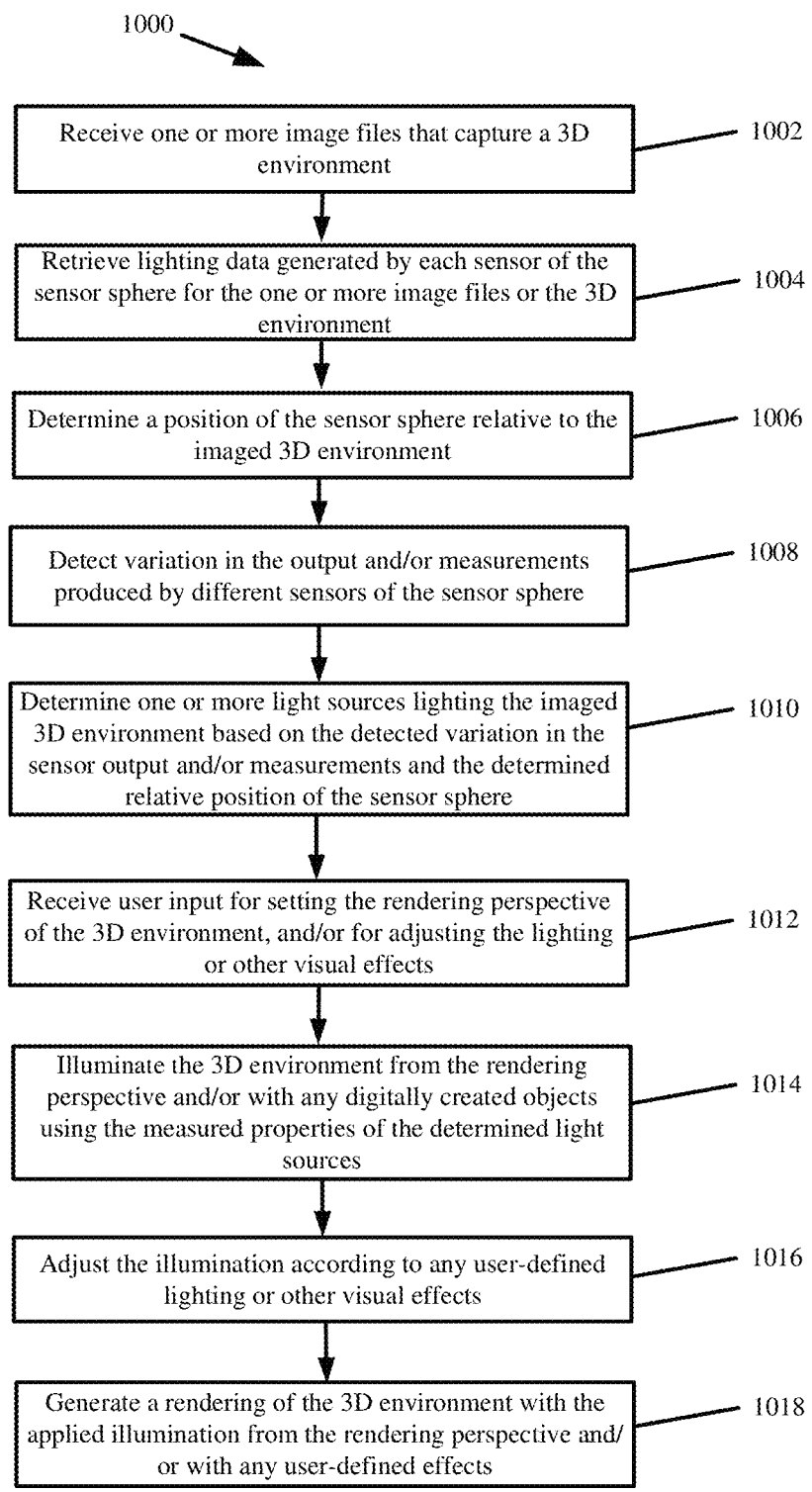
FIG. 10 presents a process for performing light source rendering of a scene in accordance with some embodiments presented herein.

FIG. 10 presents a process 1000 for performing the light source rendering of a scene in accordance with some embodiments presented herein. Process 1000 may be implemented by rendering system 601 and/or other image or video editing system that implements lighting effects based on the sensor output from sensor sphere 100.

Process 1000 may include receiving (at 1002) one or more image files for the point cloud, object, or 3D environment to be rendered. Process 1000 may include retrieving (at 1004) output from each sensor of the plurality of sensors 101 of sensor sphere 100 after sensor sphere 100 is positioned inside or around the periphery of the environment from which the point cloud, object, or 3D environment is imaged, and after the plurality of sensors 101 measure, from different directions and angles, the light that was used to illuminate the point cloud, object, or 3D environment captured in the one or more image files.

Process 1000 may include determining (at 1006) a position of sensor sphere 100 relative to the imaged point cloud, object, or 3D environment. The position of sensor sphere 100 may be stored as metadata that is provided with the sensor output, and/or may be specified as positional coordinates.

Process 1000 may include detecting (at 1008) variation in the output and/or measurements produced by different sensors 101 of sensor sphere 100. In particular, the rendering system may aggregate output from different sets of sensors to determine the directions and angles where the light is brightest, and the directions and angles at which the intensity of light falls off.

Process 1000 may include determining (at 1010) one or more light sources lighting the imaged point cloud, object, or 3D environment based on the detected (at 1008) variation in the sensor output and/or measurements and the determined (at 1006) position of sensor sphere 100 relative to the imaged point cloud, object, or 3D environment. In some embodiments, determining (at 1010) the one or more light sources may include detecting the number of distinct light sources based on different sets of sensors 101 that measure luminance spikes. In some embodiments, determining (at 1010) the one or more light sources may include detecting the exact position of each distinct light source in 3D space based on the number of sensors 101 that measure values of a particular light source, the direction and/or angle of those sensors 101, the range of measured values (e.g., maximum measured values), and/or the determined (at 1006) position of sensor sphere 100. For instance, a first set of sensors 101 at the top of sensor sphere 100 that measure values of the same light may identify a light source that is positioned above sensor sphere 100 and pointed downward, whereas a second set of sensors 101 at the side of sensor sphere 100 that measure values of the same light may identify a light source that is positioned to a particular side and pointed in a particular direction. The distance of the light sources from sensor sphere 100 may then be computed based on the values measured by each of the first and second sets of sensors 101 and the positioning of sensor sphere 100 relative to the imaged point cloud, object, or 3D environment. In some embodiments, determining (at 1010) the one or more light sources may include detecting the type of light source (e.g., spot, area, point, directional, volume, ambient, etc.) based on the number of sensors 101 measuring properties of the same light from the same light source and based on the measured falloff between neighboring sensors 101 (e.g., the difference between the maximum and minimum measured values and the number of sensors 101 between the measured maximum and minimum values). For instance, a luminance spike that is detected by 5 adjacent sensors 101 and that immediately falls off around neighboring sensors 101 (e.g., measured values decrease by 20% from the 5 adjacent sensors 101 to the neighboring sensors 101) may be indicative of a spot light source, whereas a luminance spike that is detected by sensors 101 about one side or one half of sensor sphere 100 with minimal falloff (e.g., decreases by less 5% between neighboring sensors 101) may be indicative of an ambient light source. In some embodiments, determining (at 1010) the one or more light sources may include detecting properties of each light source (e.g., tone, brightness, etc.) based on the measured values.

Process 1000 may include receiving (at 1012) user input for setting the rendering perspective from which to render the point cloud, object, or 3D environment of the one or more image files, and/or for adjusting the lighting or other visual effects of the point cloud, object, or 3D environment. For instance, the user input may specify rendering an object from a different angle and/or position than the angle and/or position at which the object was imaged. Alternatively, the user input may include insertion of a digitally created object into the imaged 3D environment, and lighting the digitally inserted object to match the lighting of the 3D environment.

Process 1000 may include illuminating (at 1014) the point cloud, object, or 3D environment from the rendering perspective and/or with any digitally created objects using the measured properties of the light sources that were determined (at 1010) from the sensor data of sensor sphere 100. In particular, illuminating (at 1014) may include lighting, coloring, shading, and/or applying other lighting effects to the point cloud, object, or 3D environment according to the number, location, direction, angle, type, and properties of each light source detected by sensor sphere 100.

Process 1000 may include adjusting (at 1016) the illumination according to any user-defined lighting or other visual effects. Process 1000 may include generating (at 1018) a rendering of the point cloud, object, or 3D environment with the applied illumination from the rendering perspective and/or with any user-defined effects. The rendering may produce a photorealistic presentation of a scene that has a rendering perspective or viewpoint that is different than an original perspective or viewpoint used to image or capture the scene, and that adjusts the lighting of the scene for the rendering perspective or viewpoint based on the determined (at 1010) number, location, direction, angle, type, and properties of each light source detected by sensor sphere 100.

In some embodiments, two or more sensor spheres 100 may be placed at different positions within a scene or 3D environment in order to more accurately determine the positioning of the light sources and/or to capture the light characteristics. The use of two or more sensor spheres 100 may be desirable for large areas or scenes with complex light arrangements to properly illuminate the entirety of the area or scene. In some such embodiments, the output from the two or more sensor spheres 100 may be combined to better differentiate the light combing from the different light sources.

Figure 11:
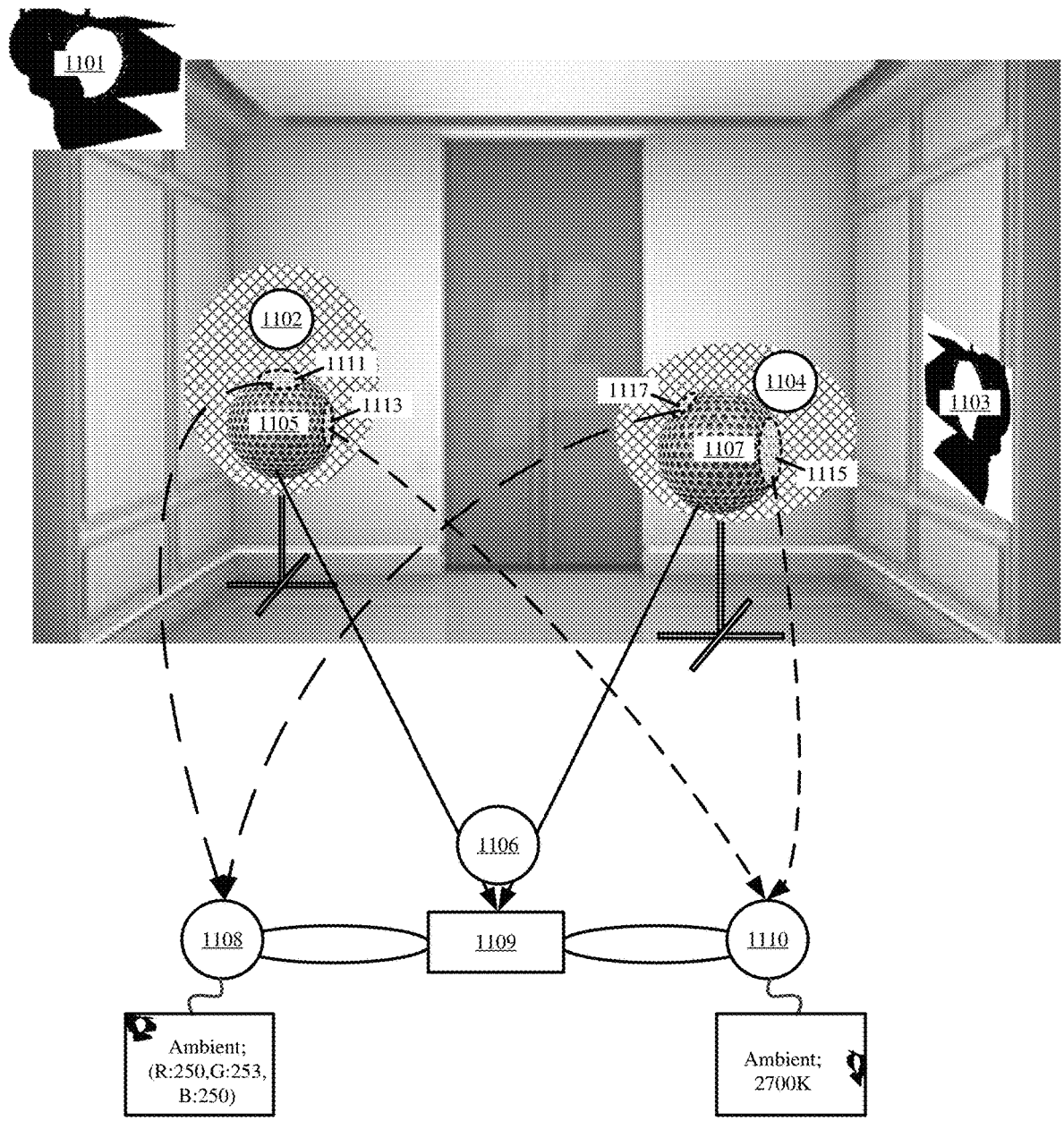
FIG. 11 illustrates an example of using two sensor spheres to accurately differentiate the light from two different light sources in accordance with some embodiments presented herein.

FIG. 11 illustrates an example of using two sensor spheres 100 to accurately differentiate the light from two different light sources in accordance with some embodiments presented herein. As shown in FIG. 11, the scene may include first ambient light source 1101 at a first position, and second ambient light source 1103 at a second position. The light from first ambient light source 1101 and second ambient light source 1103 may overlap at different regions in the scene, and may be difficult to differentiate using sensors 101 of a single sensor sphere 100. Accordingly, first sensor sphere 1105 may be located closer to the first position than second sensor sphere 1107, and second sensor sphere 1107 may be located closer to the second position than first sensor sphere 1105.

The operation and/or activation of first sensor sphere 1105 and second sensor sphere 1107 may be synchronized. In some embodiments, first sensor sphere 1105 and second sensor sphere 1107 may be synchronized by pairing the two sensor spheres via a physical cable or via wireless means such that controller 1109 may be used to simultaneously active both sensor spheres 1105 and 1107.

Upon activation, first sensor sphere 1105, that is closer to first ambient light source 1101, may obtain (at 1102) stronger measurements from first set of sensors 1111 that are orientated towards first ambient light source 1101, and weaker measurements from second set of sensors 1113 that are oriented towards the more distant second ambient light source 1103. Conversely, second sensor sphere 1107, that is closer to second ambient light source 1103, may obtain (at 1104) stronger measurements from first set of sensors 1115 that are orientated towards second ambient light source 1103, and weaker measurements from second set of sensors 1117 that are oriented towards the more distant first ambient light source 1101.

Controller 1109 of first sensor sphere 1105 and second sensor sphere 1107 may retrieve (at 1106) the measurements from each sensor sphere 1105 and 1107. In some embodiments, the measurements may be wirelessly transmitted from each sensor sphere 1105 and 1107 to controller 1109. The measurements may be tagged to include the direction, angle, and/or orientation of sensors 101 that generated the measurements, a timestamp at which the measurements were generated, and/or a location of the sensor sphere that generated the measurements.

Controller 1109 may compare the measurements from the two sensor spheres 1105 and 1107. Based on the comparison and the stronger measurements obtained by first set of sensors 1111 of first sensor sphere 1105 oriented towards first ambient light source 1101, and the weaker measurements obtained by second set of sensors 1117 of second sensor sphere 1107 orientated towards first ambient light source 1101, controller 1109 may determine (at 1108) closer positioning of first ambient light source 1101 to first sensor sphere 1107, and may determine (at 1108) the position of first ambient light source 1101 in the scene based on the position and orientation of first set of sensors 1111 from first sensor sphere 1105 used to detect first ambient light source 1101, and the position and orientation of second set of sensors 1117 from second sensor sphere 1107 used to detect first ambient light source. Moreover, controller 1109 may accurately and granularly define (at 1108) the visual characteristics of first ambient light source 1101 based on the distance between first sensor sphere 1105 and second sensor sphere 1107 and the falloff in the measurements obtained by first set of sensors 1111 of first sensor sphere 1105 and second set of sensors 1117 of second sensor sphere 1107. For instance, the falloff in intensity may be used to pinpoint a location (e.g., height, position, etc.) of first ambient light source 1101 in the scene as well as the type of light (e.g., an ambient light).

Similarly, from the stronger measurements obtained by first set of sensors 1115 of second sensor sphere 1107 oriented towards second ambient light source 1103, and the weaker measurements obtained by second set of sensors 1113 of first sensor sphere 1105 orientated towards second ambient light source 1103, controller 1109 may determine (at 1110) a position of second ambient light source 1103 in the scene and/or relative to sensor spheres 1105 and 1107, and/or may determine (at 1110) specific visual characteristics of the light emitted by second ambient light source 1103.

As noted above, sensor sphere 100 may serve as a tool or device for measuring light in a scene in order to digitally render the scene with accurate lighting from different viewpoints, accurately light objects that are digitally inserted into the scene, and/or adjust the lighting of the scene and/or area in a photorealistic manner. Sensor sphere 100 may have other applications including calibrating lighting of a scene to exactly match lighting that was used at another time to light the same scene or another scene. In particular, sensor sphere 100 may be used to identify the location for one or more lights to match prior placement of the lights, and/or to accurately adjust each of the lights to match prior lighting.

Figure 12:
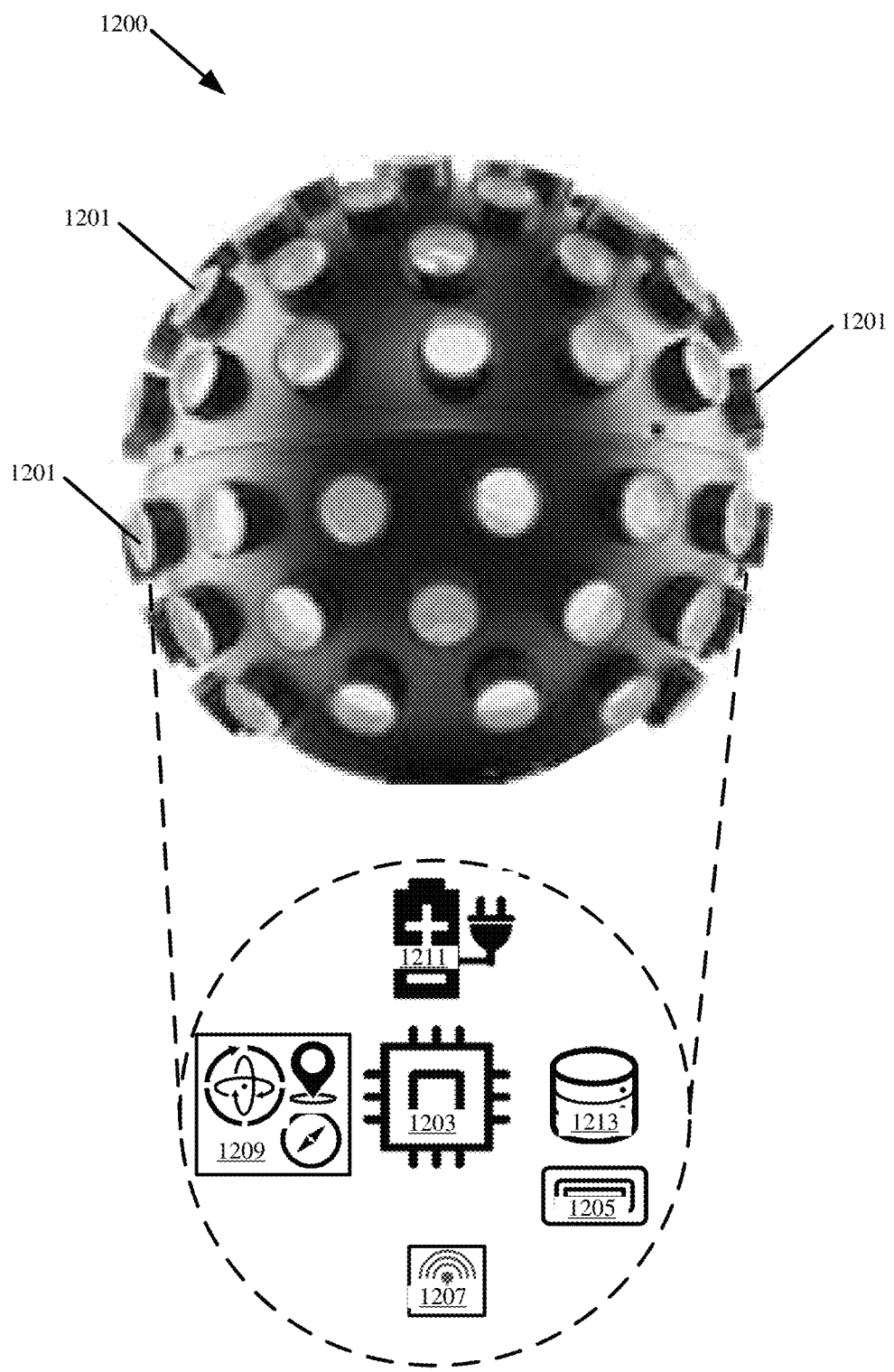
FIG. 12 illustrates an example of a light calibration device in accordance with some embodiments presented herein.

In some embodiments, sensor sphere 100 may be integrated with or may operate in conjunction with a light calibration device to perform the light calibration. FIG. 12 illustrates an example of light calibration device 1200 in accordance with some embodiments presented herein.

Light calibration device 1200 may have a same or similar shape and size as sensor sphere 100. Light calibration device 1200 may include plurality of visual indicators 1201 that may be distributed about the exterior surface of light calibration device 1200. Each visual indicator 1201 may be positioned about the surface of light calibration device 1200 with a different angle, direction, and/or orientation that matches the angle, direction, and/or orientation of a different sensor 101 from sensor sphere 100. In some embodiments, light calibration device 1200 may have fewer or more visual indicators 1201 than sensor sphere 100 has sensors 101.

Each visual indicator 1201 may include a laser or other light beam that may be separately activated or deactivated by processor 1203 of light calibration device 1200. Light calibration device 1200 may include port 1205 or wireless interface 1207 for receiving the light measurements from sensor sphere 100, and may activate one or more visual indicators 1201 to visually mark or identify the location of different light sources that are detected by sensors 101 of sensor sphere 100 and/or that are located from processing the output of sensors 101. Additionally, light calibration device 1200 may include sensors 1209 for detecting the pitch, roll, yaw, and/or orientation of light calibration device 1200, power supply 1211, and memory or storage 1213 for storing the measurements from sensor sphere 100 for processing by processor 1203.

Collectively, sensor sphere 100 and light calibration device 1200 may be used to recreate the lighting that was previously used to light a scene or area. For example, several days may have passed since a scene was captured, and there may be a need to recreate that same scene or area with the same lighting to ensure consistency. In this example, light calibration device 1200 may be used to determine if the recreate scene or area is set with the same number of light sources as the original scene, and/or if the lights for the recreated scene or area are in the same positions as the lights of the original scene or area. Alternatively, an environment or area may have been set (e.g., lit) for a daytime scene, may be reset for a nighttime environment or area, and users may use light calibration device 1200 to recreate the exact lighting of the daytime environment or area for another shoot or at a later time.

Figure 13:
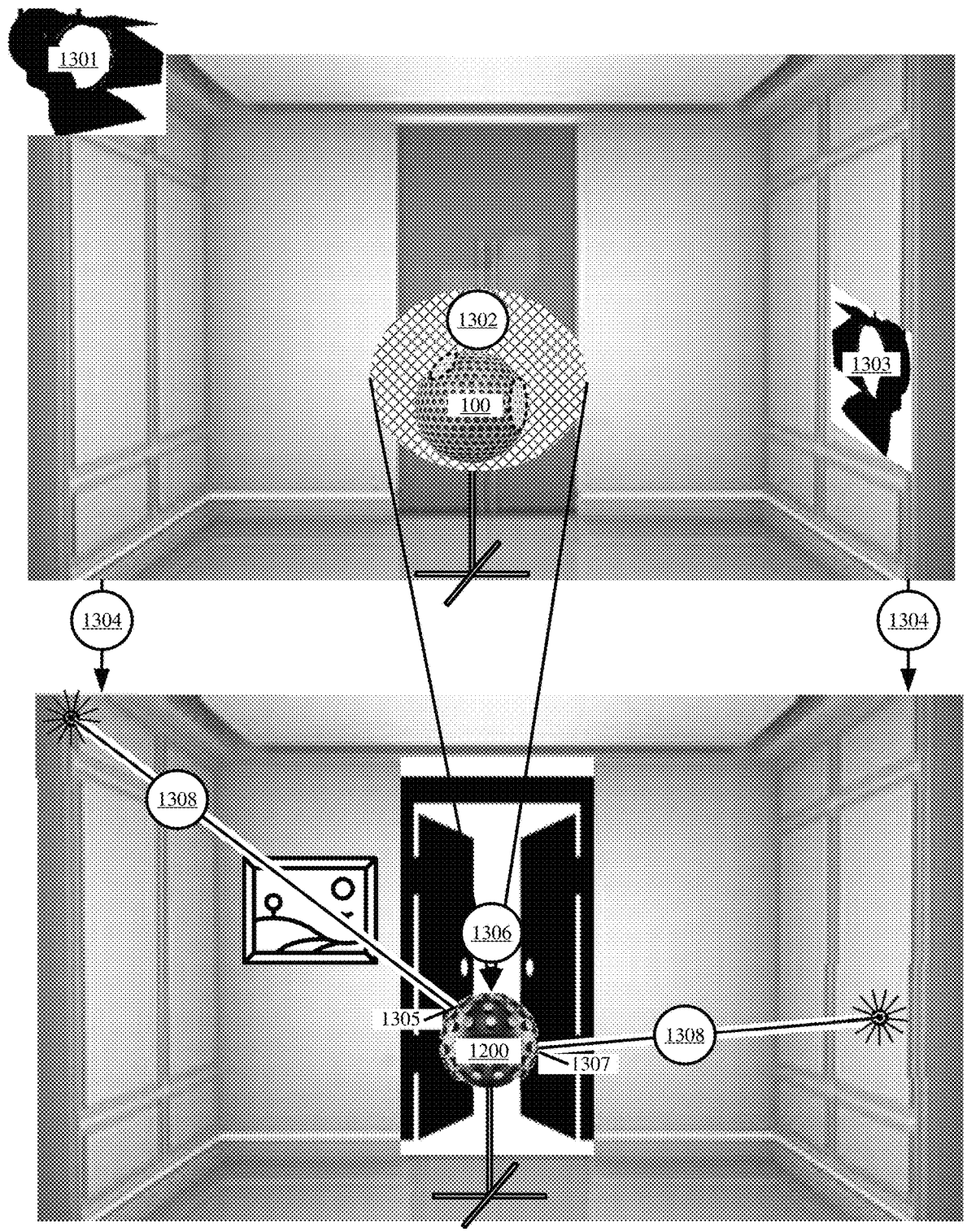
FIG. 13 illustrates using the light calibration device to recreate and match lighting that was previously used for a scene in accordance with some embodiments presented herein.

FIG. 13 illustrates using light calibration device 1200 to recreate and match lighting that was previously used for a scene in accordance with some embodiments presented herein. As shown in FIG. 13, sensor sphere 100 may be placed at a first position in a scene, and may measure (at 1302) light from two different light sources 1301 and 1303. In particular, the measurements obtained by sensors 101 of sensor sphere 100 may be analyzed to determine the angle and/or position of different subsets of sensors 101 that receive the most amount of light which may extrapolated to identify the positioning and orientation of light sources 1301 and 1303 in the scene. Moreover, the measured values and the difference in values between neighboring sensors 101 may identify the type of light, the distance of each light source 1301 and 1303 from sensor sphere 100, and/or other visual characteristics of each light source 1301 and 1303. The measurements and the derived positioning and orientation of light sources 1301 and 1303 may be stored with timestamps and a position and/or orientation of sensor sphere 100.

Although not shown, multiple sensor spheres 100 may be placed in the scene to obtain two sets of measurements from which the direction, positioning, orientation, and/or other properties of light sources 1301 and 1303 may be differentiated. In some embodiments, to aid in the detection of light sources 1301 and 1303, sensor sphere 100 may be communicably coupled, via wired or wireless means, to a light control panel or system. For instance, sensor sphere 100 may be connected to a Digital Multiplex ("DMX") or other light control system that controls the illumination of light sources 1301 and 1303. Sensor sphere 100 may send commands to the light control system to rapidly flash light source 1301 during a first time, and to rapidly flash light source 1303 during a later second time. Sensors 101 may detect the flashing at the different times to better differentiate and locate the position and orientation of each light source 1301 and 1303.

The scene may be deconstructed or changed after sensor sphere 100 is used to measure the lighting setup. For instance, elements within the scene, including light sources 1301 and 1303, may be moved or removed (at 1304).

Users may want to recreate the lighting from a particular time that was measured by sensor sphere 100. Accordingly, light calibration device 1200 may be placed within the scene to identify the prior positioning of light sources 1301 and 1303. Light calibration device 1200 may obtain (at 1306) measurements and/or derived values from sensor sphere 100 with timestamps that match or are within a threshold of the particular time. In some embodiments, light calibration device 1200 may directly receive the measurements and/or derived values through a wired or wireless connection with sensor sphere 100. In some other embodiments, the measurements and/or derived values may be downloaded from sensor sphere 100 onto another device that subsequently uploads the measurements and/or derived values to light calibration device 1200. In still some other embodiments, light calibration device 1200 may be integrated and part of sensor sphere 100 such that the measurements and/or derived values may be obtained (at 1306) directly from memory or storage of sensor sphere 100.

Preferably, light calibration device 1200 may be placed at the same position and height as sensor sphere 100 when sensor sphere 100 generated the measurements and/or derived values. In some embodiments, light calibration device 1200 may be placed at a different position or height, and may automatically compensate for the different positioning. For instance, light calibration device 1200 may determine its position via a geolocation sensor, and may compare its determined position to the position and/or orientation of sensor sphere 100 or sensors 101 that generated the received measurements and/or derived data.

In response to detecting a difference between the positioning of light calibration device 1200 and sensor sphere 100, light calibration device 1200 may adjust the measurements obtained (at 1306) from sensor sphere 100 to account for the difference in positioning. For instance, the received measurements may identify first light source 1301 at an (X1, Y1) coordinate from sensor sphere 100. Light calibration device 1200 may determine that its position is offset by a particular distance from the position of sensor sphere 100, and may adjust the measurements to identify light source 1301 to be at an (X1+Δ1, Y1+Δ2) coordinate from light calibration device 1200, wherein Δ1 and Δ2 may correspond to the detected distance or offset between sensor sphere 100 and light calibration device 1200.

Light calibration device 1200 may determine one or more first visual indicators 1305 that are positioned and oriented in the direction where light source 1301 was detected by sensor sphere 100 at the particular time, and one or more second visual indicators 1307 that are positioned and oriented in the direction where light source 1303 was detected by sensor sphere 100 at the particular time. Light calibration device 1200 may activate (at 1308) the one or more first visual indicators 1305 and the one or more second visual indicators 1307 to visually identify and/or mark the exact positions of light sources 1301 and 1303 in the scene. The users may then position and orient light sources 1301 and 1303 at the positions indicated by visual indicators 1305 and 1307.

In addition to detecting and identifying the positions of different lights in a scene, sensor sphere 100 and/or light calibration device 1200 may be used to detect and identify the positions of different reflective surfaces. Sensor sphere 100 may detect and/or differentiate a reflective surface from a light source based on the different light characteristics that are produced by a light source and a reflective surface. Light calibration device 1200 may illuminate a first set of visual indicators 1201 at a first time to identify the positions of different light sources of a scene, and may illuminate a second set of visual indicators 1201 at a second time to identify the positions of different reflective surface of the scene.

In some embodiments, a wireless controller (e.g., controller 1109) may be coupled to light calibration device 1200, and the wireless controller may be used to control light calibration device 1200 in identifying the positions of different light sources and reflective surfaces, and/or selecting different data generated by sensor sphere 100 at different time to identify the positioning of different light sources and reflective surfaces at those different times. In some embodiments, sensor sphere 100 and/or light calibration device 1200 may connect, via a wired or wireless connection, to a light control system that controls different light sources in a scene, and sensor sphere 100 and/or light calibration device 1200 may automatically adjust each of the light sources in the scene to match the lighting that was previously detected and/or measured by sensor sphere 100. For instance, sensor sphere 100 and/or light calibration device 1200 may issue commands to the light control system that adjust the brightness, coloring, warmth, temperature, frequency, and/or other adjustable visual or non-visual characteristics of each light source controlled by light control system.

Figure 14:
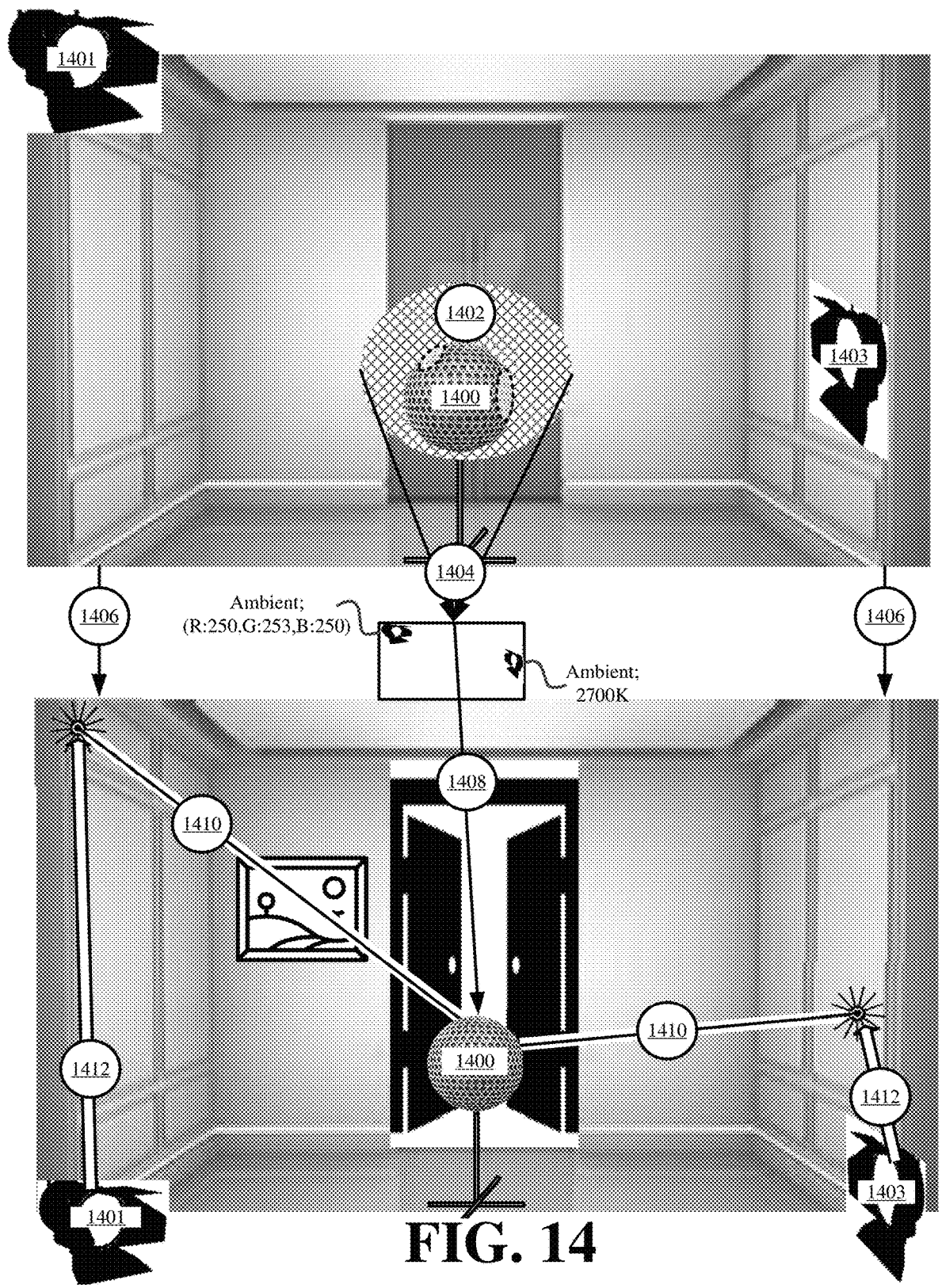
FIGS. 14 and 15 illustrate an example for the automatic calibration of scene lighting in accordance with some embodiments presented herein.
Figure 15:
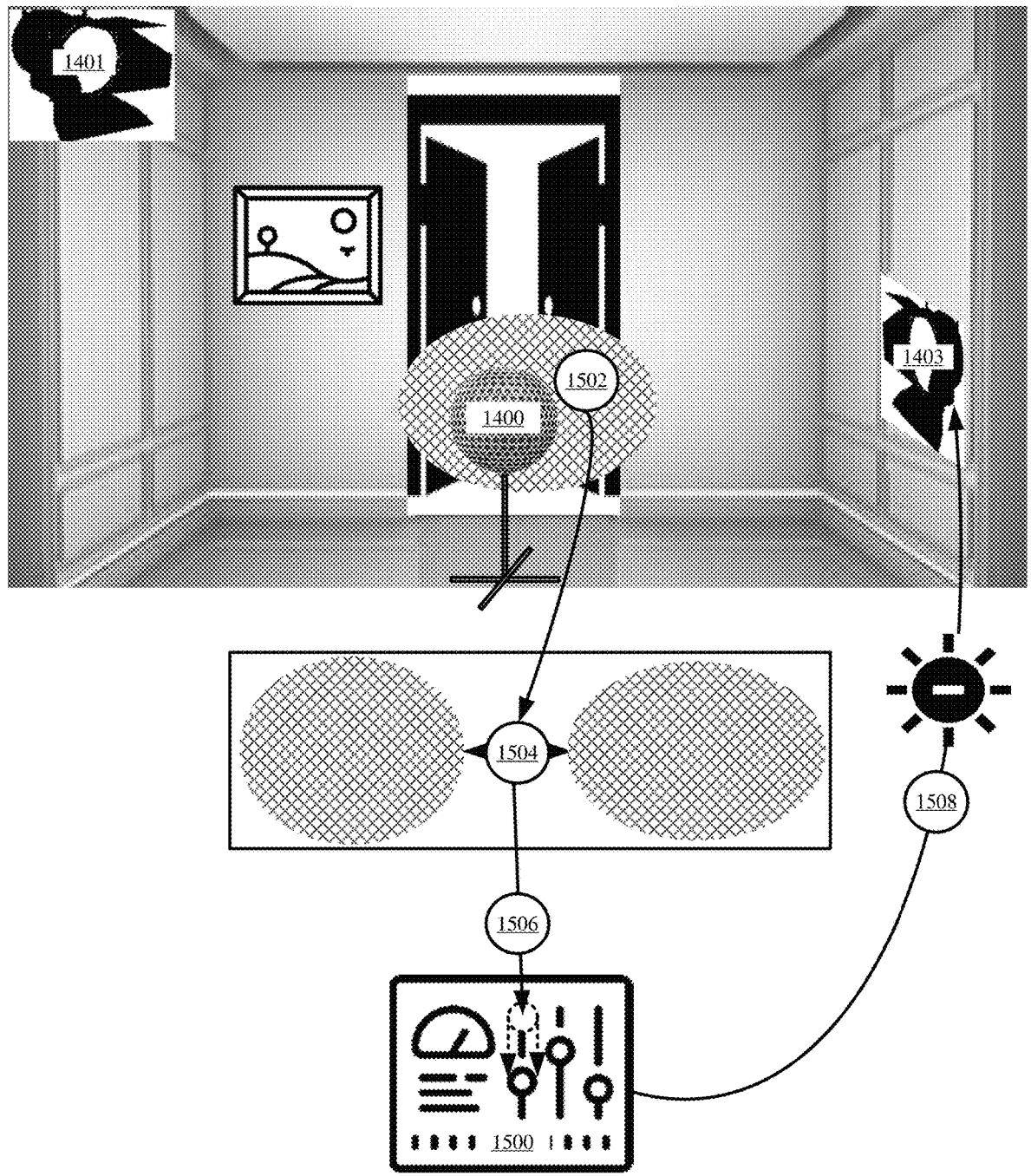

FIGS. 14 and 15 illustrate an example for the automatic calibration of scene lighting in accordance with some embodiments presented herein. As noted above, light calibration device 1200 may be integrated as part of sensor sphere 100, and the integrated device is referred to in FIGS. 14 and 15 as integrated calibration device 1400. In other words, integrated calibration device 1400 may enhance sensor sphere 100 to include visual indicators 1201 at or adjacent to each sensor 101 or a subset of sensors 101 of sensor sphere 100.

At a first time shown in FIG. 14, integrated calibration device 1400 may be placed at a center of a scene, may measure (at 1402) the scene lighting, and may detect (at 1404), based on the measurements from sensors 101, the number of light sources illuminating the scene and the position of each light source relative to integrated calibration device 1400. As before, the position of each light source may be determined from the position and orientation of sensors 101 that obtain the strongest light measurements. Integrated calibration device 1400 may detect (at 1404) first light source 1401 at a first position with a first set of visual characteristics, and may detect (at 1404) second light source 1403 at a second position with a second set of visual characteristics.

After the first time, the scene may be reconfigured (at 1406). In particular, light sources 1301 and 1303 may be moved or adjusted, thereby altering the lighting of the scene from the lighting measured at the first time by integrated calibration device 1400.

At a second time shown in FIG. 14 after the lighting of the scene has been changed, integrated calibration device 1400 may be placed back into the center of the scene to recreate the lighting from the first time. A user may interface with integrated calibration device 1400 to select and/or configure (at 1408) integrated calibration device 1400 with the set of measured data that integrated calibration device 1400 generated for the scene at the first time.

Integrated calibration device 1400 may compare its current position to the position at which the selected set of measured data was generated (e.g., positional data that is tagged to the selected set of measured data). In response to detecting a change in positioning, integrated calibration device 1400 may adjust the set of measured data to identify the position of light sources 1301 and 1303 relative to the current position of integrated calibration device 1400. Integrated calibration device 1400 may activate (at 1410) a first visual indicator to beam a first laser at the first position for light source 1301, and may activate (at 1410) a second visual indicator to beam a second laser at the second position for light source 1303.

Using the visual indications, a user may move (at 1412) light sources 1301 and 1303 back to the indicated positions. FIG. 15 illustrates the scene once light sources 1301 and 1303 are positioned back at the first position and the second position respectively and turned on. As shown in FIG. 15, integrated calibration device 1400 may measure (at 1502) the light from each light source 1301 and 1303.

Integrated calibration device 1400 may compare (at 1504) the visual characteristics of the repositioned lights to the visual characteristics that were generated during the first time. Based on the comparison, integrated calibration device 1400 may detect that the visual characteristics of the light being emitted from second light source 1303 at the second time differs from the second set of visual characteristics previously measured from second light source 1303 at the first time. Integrated calibration device 1400 may quantify differences in specific visual characteristics, and may control (at 1506) light control system 1500 to adjust (at 1508) the specific visual characteristics of second light source 1303 until the measured light output from second light source 1303 at the second time matches the second set of visual characteristics that were measured from second light source 1303 at the first time. For instance, integrated calibration device 1400 may directly increase or decrease the brightness of second light source 1303 by changing a dimmer setting, may change the color tone or color of emitted light, and/or may change the type of light being emitted (e.g., change from a spot light to a directional light).

In some embodiments, the visual characteristics measured by sensors 101 of sensor sphere 100 or integrated calibration device 1400, and/or the derived data for the number and/or positioning of light sources may be mapped and presented in a graphical user interface ("GUI"). For instance, the GUI may include a virtual layout of the set or scene, and the data from sensor sphere 100 or integrated calibration device 1400 may be used to populate the GUI with the light sources at positions in the virtual layout that correspond to physical positions of the light sources on the set or scene. The GUI allows users with alternative means to recreate the lighting from a previous setup or lighting installation without having to refer to the visual indicators provided by light calibration device 1200 or integrated calibration device 1400.

In some embodiments, the measured visual characteristics and/or the derived data for the number and/or positioning of light sources may be mapped to virtual lighting of a gaming engine, rendering system 601, or other system that creates, renders, and/or lights a virtual recreation of the scene. In other words, the measurements obtained by sensor sphere 100 or integrated calibration device 1400 may be used to insert and configure virtual lights in a virtual scene with the same virtual characteristics at actual lights in a corresponding physical scene.

Figure 16:
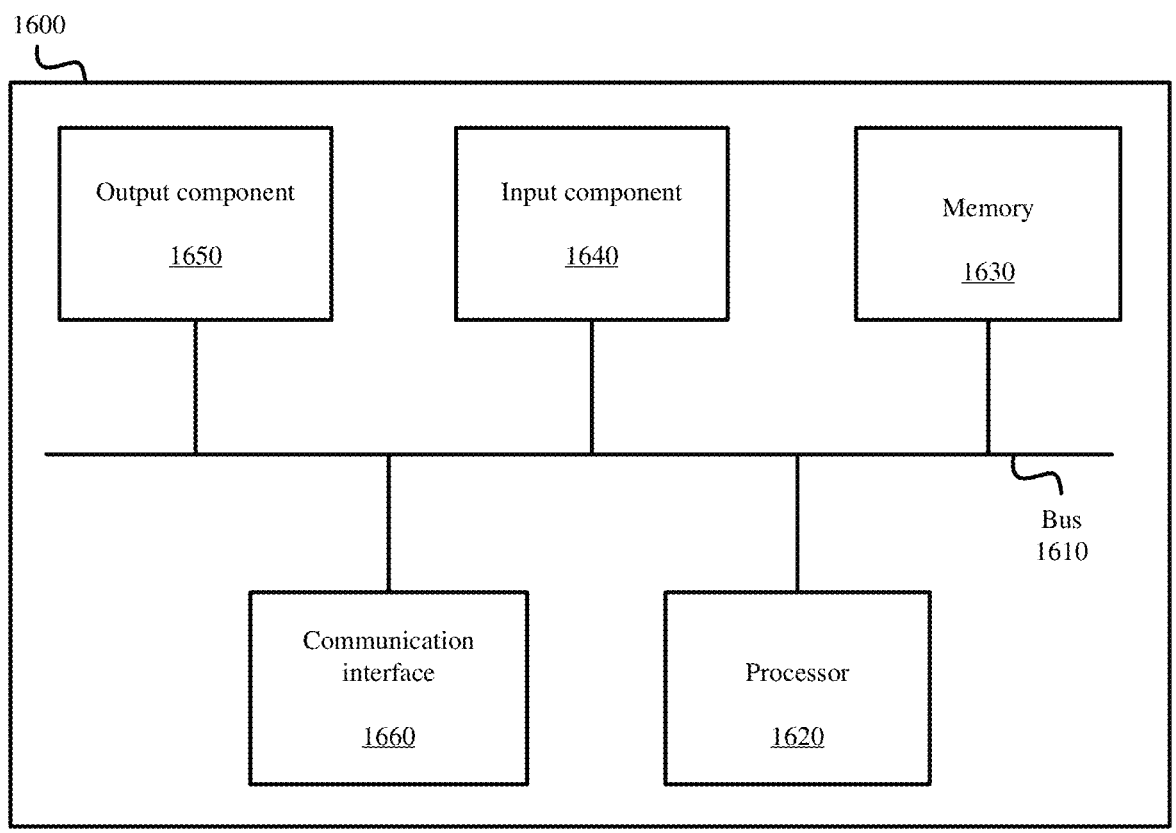
FIG. 16 illustrates example components of one or more devices, according to one or more embodiments described herein.

FIG. 16 is a diagram of example components of device 1600. Device 1600 may be used to implement one or more of the devices or systems described above (e.g., sensor sphere 100, rendering system 601, light calibration device 1200, integrated calibration device 1400, etc.). Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600, such as a keyboard, a keypad, a button, a switch, etc. Output component 1650 may include a mechanism that outputs information to the operator, such as a display, a speaker, one or more LEDs, etc.

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing software instructions stored in a computer-readable medium, such as memory 1630. A computer-readable medium may be defined as a non-transitory memory device. A memory device may include space within a single physical memory device or spread across multiple physical memory devices. The software instructions may be read into memory 1630 from another computer-readable medium or from another device. The software instructions stored in memory 1630 may cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    obtaining a plurality of measurements from a common position in a three-dimensional ("3D") environment with each measurement of the plurality of measurements comprising a first set of values corresponding to one or more light properties reaching the common position from a different direction or a different angle, and a second set of values for the different direction or the different angle at which the first set of values are measured;
    receiving one or more images that capture the 3D environment and lighting of the 3D environment from a first perspective;
    determining a first set of the plurality of measurements that have the second set of values matching a first direction or first angle of the first perspective at which the one or more images of the 3D environment are captured;
    receiving input for rendering the 3D environment from a second perspective that is different than the first perspective;
    determining a second set of the plurality of measurements that have the second set of values matching a second direction or a second angle of the second perspective; and
    rendering the 3D environment from the second perspective with lighting that differs from the lighting of the 3D environment in the one or more images from the first perspective based on the one or more images and a difference between the first set of values from the second set of measurements and the first set of values from the first set of measurements.

2. The method of claim 1 further comprising:
    receiving the plurality of measurements from a sensor sphere comprising a plurality of sensors, wherein each measurement of the plurality of measurements corresponds to output from a different sensor of the plurality of sensors that is oriented in a different direction or angle about a surface of the sensor sphere; and
    wherein receiving the one or more images comprises receiving the one or more images from one or more cameras that image the 3D environment from the first perspective, and with the first perspective being derived from positioning of the one or more cameras in the 3D environment.

3. The method of claim 2 further comprising:
    determining the second angle and the second direction of the second perspective from the input; and
    selecting the output from a set of the plurality of sensors that are oriented with the second angle and the second direction.

4. The method of claim 1 further comprising:
    generating the plurality of measurements with a plurality of sensors that are distributed over a surface of a sphere with each sensor of the plurality of sensors having a different direction and angle corresponding to the second set of values from a different measurement of the plurality of measurements.

5. The method of claim 1 further comprising:
    detecting different spikes of luminance or coloring in the first set of values from different sets of the plurality of measurements; and
    determining a number of light sources illuminating the 3D environment and a position of each light source based on the second set of values from the different sets of the plurality of measurements.

6. The method of claim 5, wherein rendering the 3D environment comprises:
    modifying illumination in a digital rendering of the 3D environment based on the number of light sources and the position of each light source providing different lighting to the second perspective than to the first perspective.

7. The method of claim 1 further comprising:
    detecting different amounts of falloff in the first set of values from different sets of the plurality of measurements; and
    determining different types of light sources illuminating the 3D environment based on the different amounts of falloff in the first set of values.

8. The method of claim 7, wherein illuminating the 3D environment comprises:
    modifying illumination in a digital rendering of the 3D environment based on different amounts of light from the different types of light sources reaching the second perspective than the first perspective.

9. The method of claim 1, wherein rendering the 3D environment comprises:
    changing one or more of lighting, coloring, reflectivity, and shading captured in the one or more images for a particular portion of the 3D environment in response to changing from the first perspective to the second perspective.

10. The method of claim 1, wherein rendering the 3D environment comprises:
computing the difference between the first set of values from the second set of measurements and the first set of values from the first set of measurements;
determining a modification to visual characteristics of a particular portion of the 3D environment captured from the first perspective in the one or more images based on the difference; and
altering one or more of lighting, coloring, and shading of the particular portion by applying the modification to a digital representation of the particular portion when rendering the 3D environment from the second perspective.

11. The method of claim 1, wherein rendering the 3D environment comprises:
determining color component values at a particular portion of the 3D environment in the one or more images of the 3D environment from the first perspective; and
modifying the color component values for a digital representation of the particular portion of the 3D environment according to the difference between the first set of values from the second set of measurements and the first set of values from the first set of measurements.

12. The method of claim 1 further comprising:
generating the plurality of measurements in response to measuring lighting from a position within the 3D environment that corresponds to a center of the one or more images.

13. The method of claim 1 further comprising:
generating the plurality of measurements in response to measuring lighting from one or more positions at a periphery of the 3D environment from which each image of the one or more images is taken.

14. The method of claim 1,
wherein measuring the first set of values comprises a value measuring reflectivity at a particular point within the 3D environment; and
wherein rendering the 3D environment comprises adding one or more specular highlights within a digital representation of the 3D environment based on different values measuring reflectivity at different points within the 3D environment.

15. A rendering system comprising:
one or more processors configured to:
obtain a plurality of measurements from a common position in a three-dimensional ("3D") environment with each measurement of the plurality of measurements comprising a first set of values corresponding to one or more light properties reaching the common position from a different direction or a different, and a second set of values for the different direction or the different angle at which the first set of values are measured;
receive one or more images that capture the 3D environment and lighting of the 3D environment from a first perspective;
determine a first set of the plurality of measurements that have the second set of values matching a first direction or first angle of the first perspective at which the one or more images of the 3D environment are captured;
receive input for rendering the 3D environment from a second perspective that is different than the first perspective;
determine a second set of the plurality of measurements that have the second set of values matching a second direction or a second angle of the second perspective; and
render the 3D environment from the second perspective with lighting that differs from the lighting of the 3D environment in the one or more images from the first perspective based on the one or more images and a difference between the first set of values from the second set of measurements and the first set of values from the first set of measurements.

16. The rendering system of claim 15, wherein the one or more processors are further configured to:
detect different spikes of luminance in the first set of values from different sets of the plurality of measurements; and
determine a number of light sources illuminating the 3D environment and a position of each light source based on the second set of values from the different sets of the plurality of measurements.

17. The rendering system of claim 16, wherein rendering the 3D environment comprises:
modifying illumination in a digital rendering of the 3D environment based on the number of light sources and the position of each light source providing different lighting to the second perspective than to the first perspective.

18. A non-transitory computer-readable medium, storing a plurality of processor-executable instructions to:
obtain a plurality of measurements from a common position in a three-dimensional ("3D") environment with each measurement of the plurality of measurements comprising a first set of values corresponding to one or more light properties reaching the common position from a different direction or a different, and a second set of values for the different direction or the different angle at which the first set of values are measured;
receive one or more images that capture the 3D environment and lighting of the 3D environment from a first perspective;
determine a first set of the plurality of measurements that have the second set of values matching a first direction or first angle of the first perspective at which the one or more images of the 3D environment are captured;
receive input for rendering the 3D environment from a second perspective that is different than the first perspective;
determine a second set of the plurality of measurements that have the second set of values matching a second direction or a second angle of the second perspective; and
render the 3D environment from the second perspective with lighting that differs from the lighting of the 3D environment in the one or more images from the first perspective based on the one or more images and a difference between the first set of values from the second set of measurements and the first set of values from the first set of measurements.

* * * * *